United States Patent
Park et al.

(10) Patent No.: US 11,641,301 B2
(45) Date of Patent: May 2, 2023

(54) METHODS AND APPARATUS FOR TRP DIFFERENTIATION BASED ON SSB GROUPING

(71) Applicant: QUALCOMM Incorporated, San Diego, CA (US)

(72) Inventors: Sungwoo Park, Seoul (KR); Wooseok Nam, San Diego, CA (US); Tao Luo, San Diego, CA (US); Kiran Venugopal, Raritan, NJ (US); Tianyang Bai, Somerville, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 92 days.

(21) Appl. No.: 17/131,590

(22) Filed: Dec. 22, 2020

(65) Prior Publication Data
US 2021/0266215 A1 Aug. 26, 2021

Related U.S. Application Data

(60) Provisional application No. 62/980,115, filed on Feb. 21, 2020.

(51) Int. Cl.
| | | |
|---|---|---|
| *H04L 27/26* | (2006.01) | |
| *H04L 5/00* | (2006.01) | |
| *H04B 7/06* | (2006.01) | |
| *H04W 76/27* | (2018.01) | |
| *H04W 48/12* | (2009.01) | |
| *H04W 74/00* | (2009.01) | |

(52) U.S. Cl.
CPC ....... *H04L 27/2657* (2013.01); *H04B 7/0695* (2013.01); *H04L 5/0005* (2013.01);
(Continued)

(58) Field of Classification Search
CPC ... H04B 7/024; H04B 7/0695; H04L 27/2615; H04L 27/2655; H04L 27/2657;
(Continued)

(56) References Cited

U.S. PATENT DOCUMENTS

| | | | |
|---|---|---|---|
| 2019/0379506 A1 | 12/2019 | Cheng | |
| 2020/0169347 A1* | 5/2020 | Cho | H04W 56/001 |
| 2021/0167821 A1* | 6/2021 | Chen | H04B 7/0408 |
| 2021/0211329 A1* | 7/2021 | Wu | H04L 25/0226 |
| 2021/0400700 A1* | 12/2021 | Wang | H04L 5/005 |

(Continued)

FOREIGN PATENT DOCUMENTS

CN 110536435 A 12/2019

OTHER PUBLICATIONS

International Search Report and Written Opinion—PCT/US2021/018719—ISA/EPO—dated May 20, 2021.
(Continued)

*Primary Examiner* — Derrick V Rose
(74) *Attorney, Agent, or Firm* — Procopio, Cory, Hargreaves & Savitch LLP

(57) ABSTRACT

The present disclosure relates to methods and devices for wireless communication including an apparatus, e.g., a UE and/or a base station. The apparatus can receive SSB grouping information associated with one or more SSB groups, each of the one or more SSB groups including one or more TRPs. The apparatus can also receive at least one of TCI information or QCL information, each of the TCI information and the QCL information indicating an SSB of the one or more SSB groups that is associated with a downlink Tx beam for downlink data or an uplink Rx beam for uplink data. Additionally, the apparatus can communicate the downlink data from or the uplink data to TRPs in a same SSB group or TRPs in different SSB groups based on at least one of the SSB grouping information, the TCI information, or the QCL information.

25 Claims, 11 Drawing Sheets

(52) U.S. Cl.
CPC ......... *H04L 27/2615* (2013.01); *H04W 48/12* (2013.01); *H04W 74/006* (2013.01); *H04W 76/27* (2018.02)

(58) Field of Classification Search
CPC ... H04L 5/0005; H04L 5/0023; H04L 5/0044; H04L 5/0053; H04L 5/0094; H04W 48/12; H04W 48/16; H04W 56/0015; H04W 56/0045; H04W 74/006; H04W 76/27
See application file for complete search history.

(56) References Cited

U.S. PATENT DOCUMENTS

2022/0007275 A1* 1/2022 Li .................. H04W 48/17
2022/0070026 A1* 3/2022 Chavva ............... H04L 27/2695

OTHER PUBLICATIONS

Mitsubishi Electric: "Views on Multi-Panel/TRP MIMO Transmission", 3GPP TSG RAN WG1 Meeting #94b, 3GPP Draft, R1-1811483-RAN194B_Multi Panel_A, 3rd Generation Partnership Project (3GPP), Mobile Competence Centre, 650, Route Des Lucioles, F-06921 Sophia-Antipolis Cedex, France, vol. RAN WG1, No. Chengdu, China, Oct. 8, 2018-Oct. 12, 2018, Sep. 28, 2018 (Sep. 28, 2018), 6 Pages, XP051518886, Retrieved from the Internet: URL: https://www.3gpp.org/ftp/tsg_ran/WG1_RL1/TSGR1_94b/Docs/R1-1811483.zip [retrieved on Sep. 28, 2018], Figure 2.

* cited by examiner

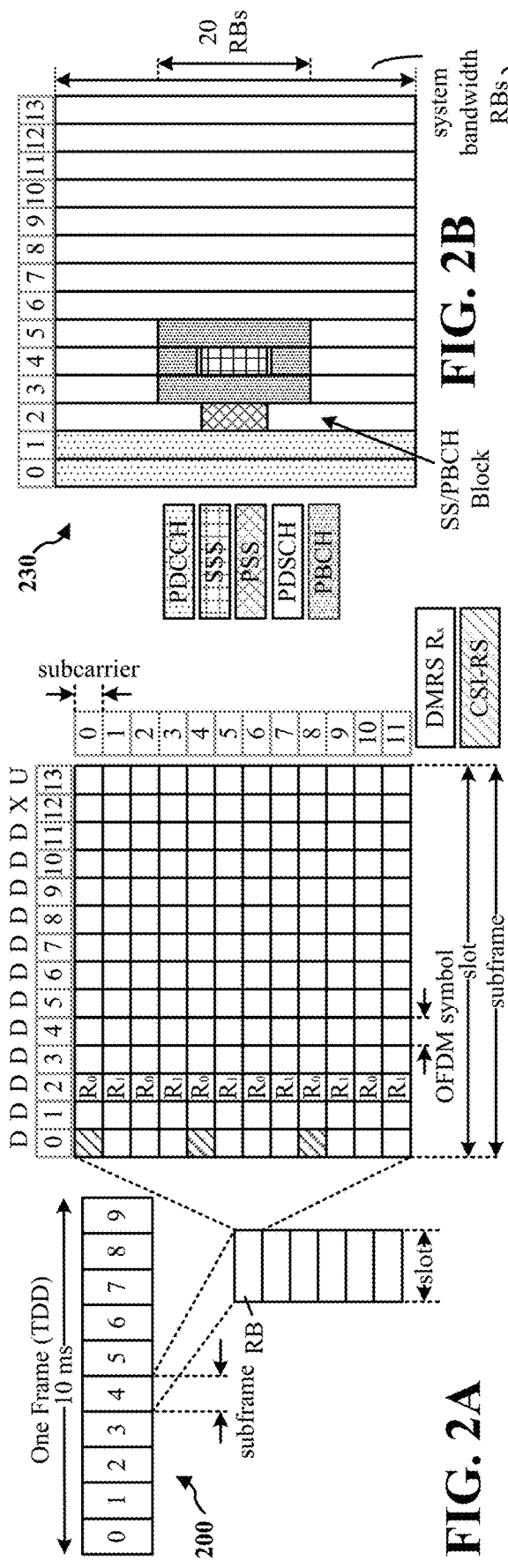
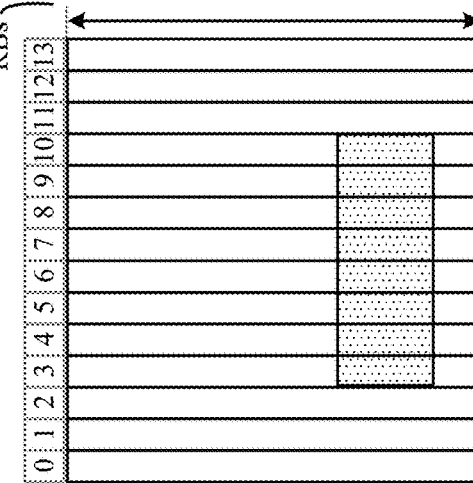
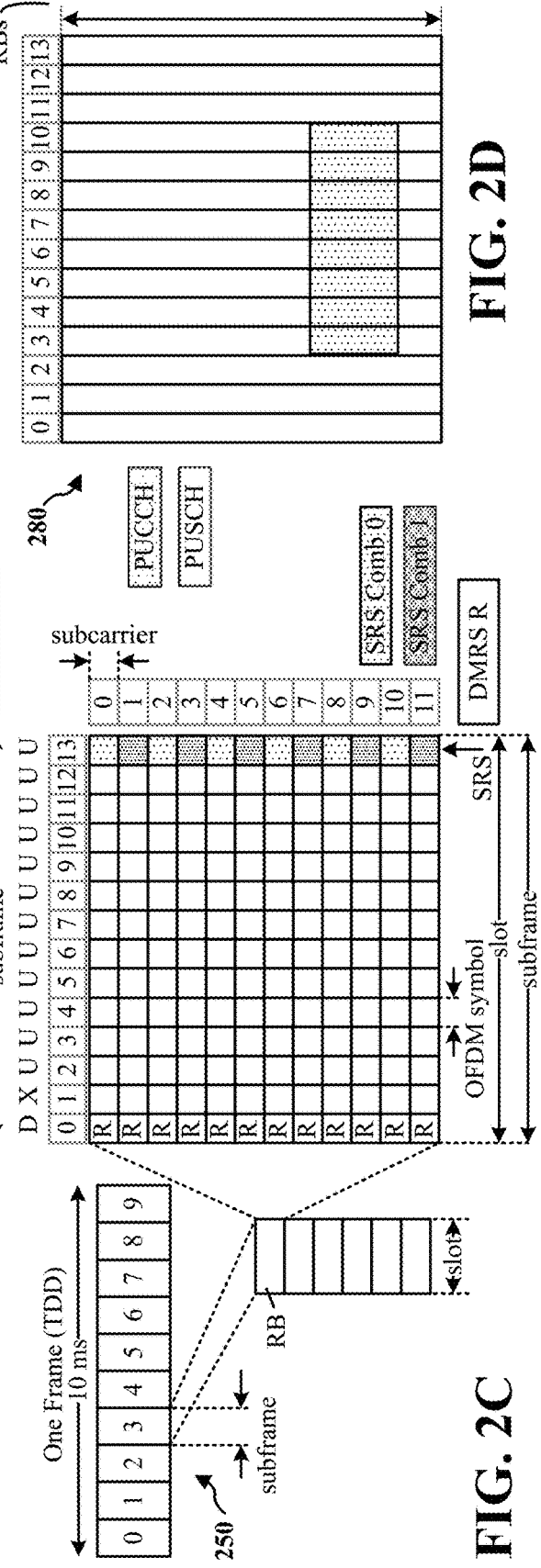
FIG. 2A
FIG. 2B
FIG. 2C
FIG. 2D

METHODS AND APPARATUS FOR TRP DIFFERENTIATION BASED ON SSB GROUPING

CROSS REFERENCE TO RELATED APPLICATION(S)

This application claims the benefit of U.S. Provisional Application Ser. No. 62/980,115, entitled "METHODS AND APPARATUS FOR TRP DIFFERENTIATION BASED ON SSB GROUPING" and filed on Feb. 21, 2020, which is expressly incorporated by reference herein in its entirety.

BACKGROUND

Technical Field

The present disclosure relates generally to communication systems, and more particularly, to spatial relation information in wireless communication systems.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a user equipment (UE). The apparatus may receive synchronization signal block (SSB) grouping information associated with one or more SSB groups, each of the one or more SSB groups can include one or more transmit-receive points (TRPs). The apparatus can also receive at least one of transmission configuration indication (TCI) information or quasi co-location (QCL) information, where each of the TCI information and the QCL information can indicate an SSB of the one or more SSB groups that is associated with a downlink transmit (Tx) beam for downlink data or an uplink receive (Rx) beam for uplink data. Additionally, the apparatus can select at least one Rx beam or Tx beam for communication based on at least one SSB attribute associated with at least one of the multiple SSBs. The apparatus can also perform a Doppler shift estimate for at least one Rx beam, where the downlink data can be communicated from the TRPs in the same SSB group or the TRPs in different SSB groups based on the Doppler shift estimate. The apparatus can also identify at least one of one or more timing advance (TA) parameters or one or more power control (PC) parameters for at least one Tx beam, where the uplink data can be communicated to the TRPs in the same SSB group or the TRPs in different SSB groups based on at least one of the one or more TA parameters or the one or more PC parameters. Further, the apparatus can determine whether the downlink data is communicated from or the uplink data is communicated to the TRPs in the same SSB group of the one or more SSB groups or the TRPs in different SSB groups of the one or more SSB groups based on at least one of the SSB grouping information, the TCI information, or the QCL information. The apparatus can also communicate the downlink data from or the uplink data to TRPs in a same SSB group of the one or more SSB groups or TRPs in different SSB groups of the one or more SSB groups based on at least one of the SSB grouping information, the TCI information, or the QCL information. The apparatus can also receive the downlink data from or transmit the uplink data to the TRPs in the same SSB group of the one or more SSB groups or the TRPs in different SSB groups of the one or more SSB groups based on at least one of the SSB grouping information, the TCI information, or the QCL information. The apparatus can also decode the downlink data received from the TRPs in the same SSB group of the one or more SSB groups or the TRPs in different SSB groups of the one or more SSB groups based on at least one of the SSB grouping information, the TCI information, or the QCL information.

In an aspect of the disclosure, a method, a computer-readable medium, and an apparatus are provided. The apparatus may be a base station or a TRP. The apparatus may determine SSB grouping information associated with one or more SSB groups. The apparatus may also transmit synchronization signal block (SSB) grouping information associated with one or more SSB groups, each of the one or more SSB groups including one or more TRPs. Additionally, the apparatus may transmit at least one of transmission configuration indication (TCI) information or quasi co-location (QCL) information, where each of the TCI information and the QCL information can indicate an SSB of the one or more SSB groups that is associated with a downlink transmit (Tx) beam for downlink data or an uplink receive (Rx) beam for uplink data. The apparatus may also encode the downlink data transmitted to the at least one UE based on at least one of the SSB grouping information, the TCI information, or the QCL information. The apparatus may also communicate the downlink data to or the uplink data from at least one user equipment (UE) based on at least one of the SSB grouping information, the TCI information, or the QCL information. The apparatus may also transmit the downlink data to or receive the uplink data from the at least one UE based on at least one of the SSB grouping information, the TCI information, or the QCL information.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5GNR frame, DL channels within a 5G/NR subframe, a second 5GNR frame, and UL channels within a 5GNR subframe, respectively.

DETAILED DESCRIPTION

Figure 1:
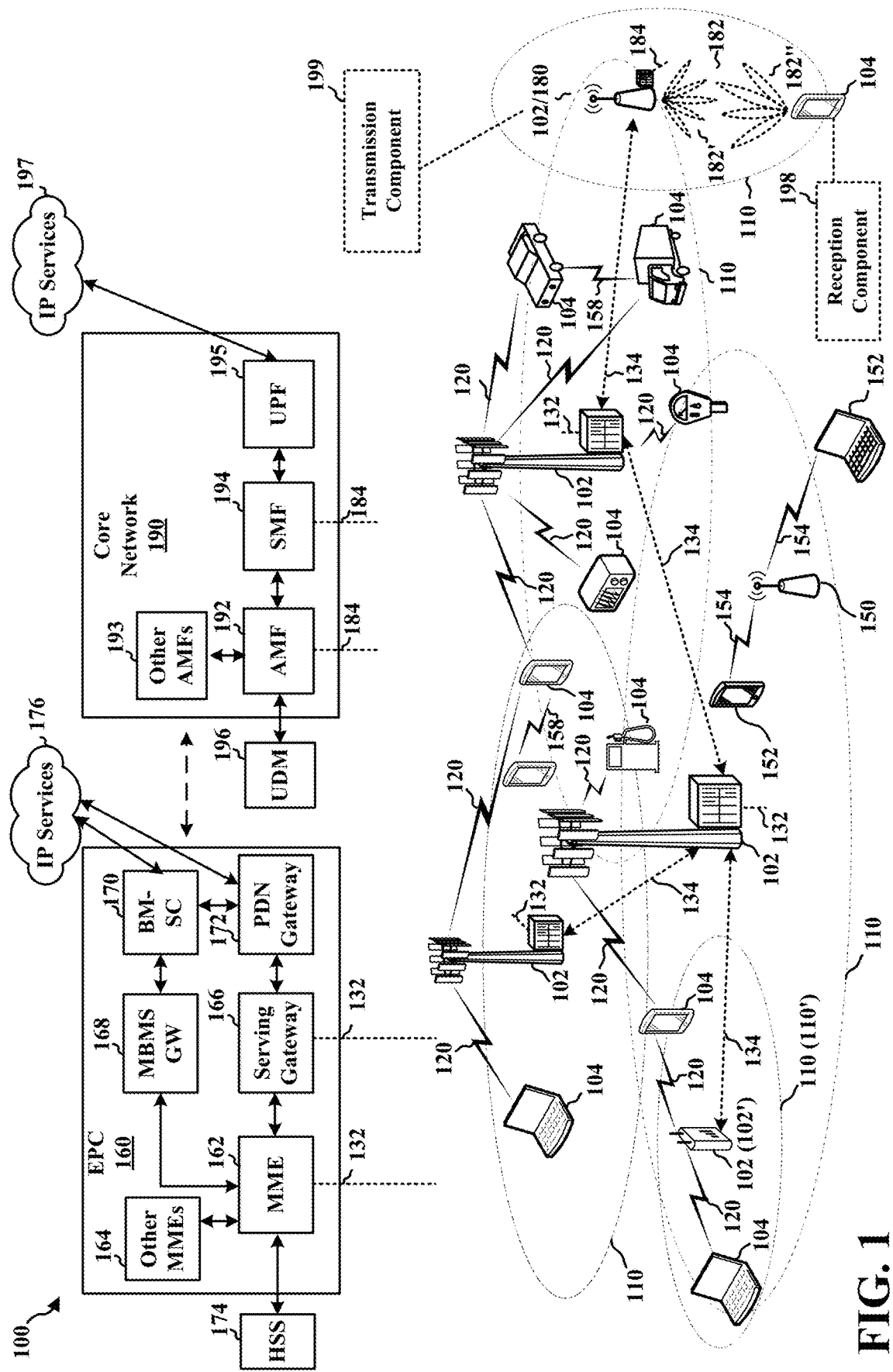
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may include a reception component 198 configured to receive synchronization signal block (SSB) grouping information associated with one or more SSB groups, each of the one or more SSB groups can include one or more transmit-receive points (TRPs). Reception component 198 may also be configured to receive at least one of transmission configuration indication (TCI) information or quasi co-location (QCL) information, where each of the TCI information and the QCL information can indicate an SSB of the one or more SSB groups that is associated with a downlink transmit (Tx) beam for downlink data or an uplink receive (Rx) beam for uplink data. Reception component 198 may also be configured to select at least one Rx beam or Tx beam for communication based on at least one SSB attribute associated with at least one of the multiple SSBs. Reception component 198 may also be configured to perform a Doppler shift estimate for at least one Rx beam, where the downlink data can be communicated from the TRPs in the same SSB group or the TRPs in different SSB groups based on the Doppler shift estimate. Reception component 198 may also be configured to identify at least one of one or more timing advance (TA) parameters or one or more power control (PC) parameters for at least one Tx beam, where the uplink data can be communicated to the TRPs in the same SSB group or the TRPs in different SSB groups based on at least one of the one or more TA parameters or the one or more PC parameters. Reception component 198 may also be configured to determine whether the downlink data is communicated from or the uplink data is communicated to the TRPs in the same SSB group of the one or more SSB groups or the TRPs in different SSB groups of the one or more SSB groups based on at least one of the SSB grouping information, the TCI information, or the QCL information. Reception component 198 may also be configured to communicate the downlink data from or the uplink data to TRPs in a same SSB group of the one or more SSB groups or TRPs in different SSB groups of the one or more SSB groups based on at least one of the SSB grouping information, the TCI information, or the QCL information. Reception component 198 may also be configured to receive the downlink data from or transmit the uplink data to the TRPs in the same SSB group of the one or more SSB groups or the TRPs in different SSB groups of the one or more SSB groups based on at least one of the SSB grouping information, the TCI information, or the QCL information. Reception component 198 may also be configured to decode the downlink data received from the TRPs in the same SSB group of the one or more SSB groups or the TRPs in different SSB groups of the one or more SSB groups based on at least one of the SSB grouping information, the TCI information, or the QCL information.

Referring again to FIG. 1, in certain aspects, the base station 180 may include a transmission component 199 configured to determine SSB grouping information associated with one or more SSB groups. Transmission component 199 may also be configured to transmit synchronization signal block (SSB) grouping information associated with one or more SSB groups, each of the one or more SSB groups including one or more TRPs. Transmission component 199 may also be configured to transmit at least one of transmission configuration indication (TCI) information or quasi co-location (QCL) information, where each of the TCI information and the QCL information can indicate an SSB of the one or more SSB groups that is associated with a downlink transmit (Tx) beam for downlink data or an uplink receive (Rx) beam for uplink data. Transmission component 199 may also be configured to encode the downlink data transmitted to the at least one UE based on at least one of the SSB grouping information, the TCI information, or the QCL information. Transmission component 199 may also be configured to communicate the downlink data to or the uplink data from at least one user equipment (UE) based on at least one of the SSB grouping information, the TCI information, or the QCL information. Transmission component 199 may also be configured to transmit the downlink data to or receive the uplink data from the at least one UE based on at least one of the SSB grouping information, the TCI information, or the QCL information.

Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies µ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology there are 14 symbols/slot and $2^\mu$ slots/subframe. The subcarrier spacing and symbol length/duration are a function of the numerology. The subcarrier spacing may be equal to $2^\mu*15$ kHz, where µ is the numerology 0 to 5. As such, the numerology µ=0 has a subcarrier spacing of 15 kHz and the numerology µ=5 has a subcarrier spacing of 480 kHz. The symbol length/duration is inversely related to the subcarrier spacing. FIGS. 2A-2D provide an example of slot configuration 0 with 14 symbols per slot and numerology µ=2 with 4 slots per subframe. The slot duration is 0.25 ms, the subcarrier spacing is 60 kHz, and the symbol duration is approximately 16.67 µs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
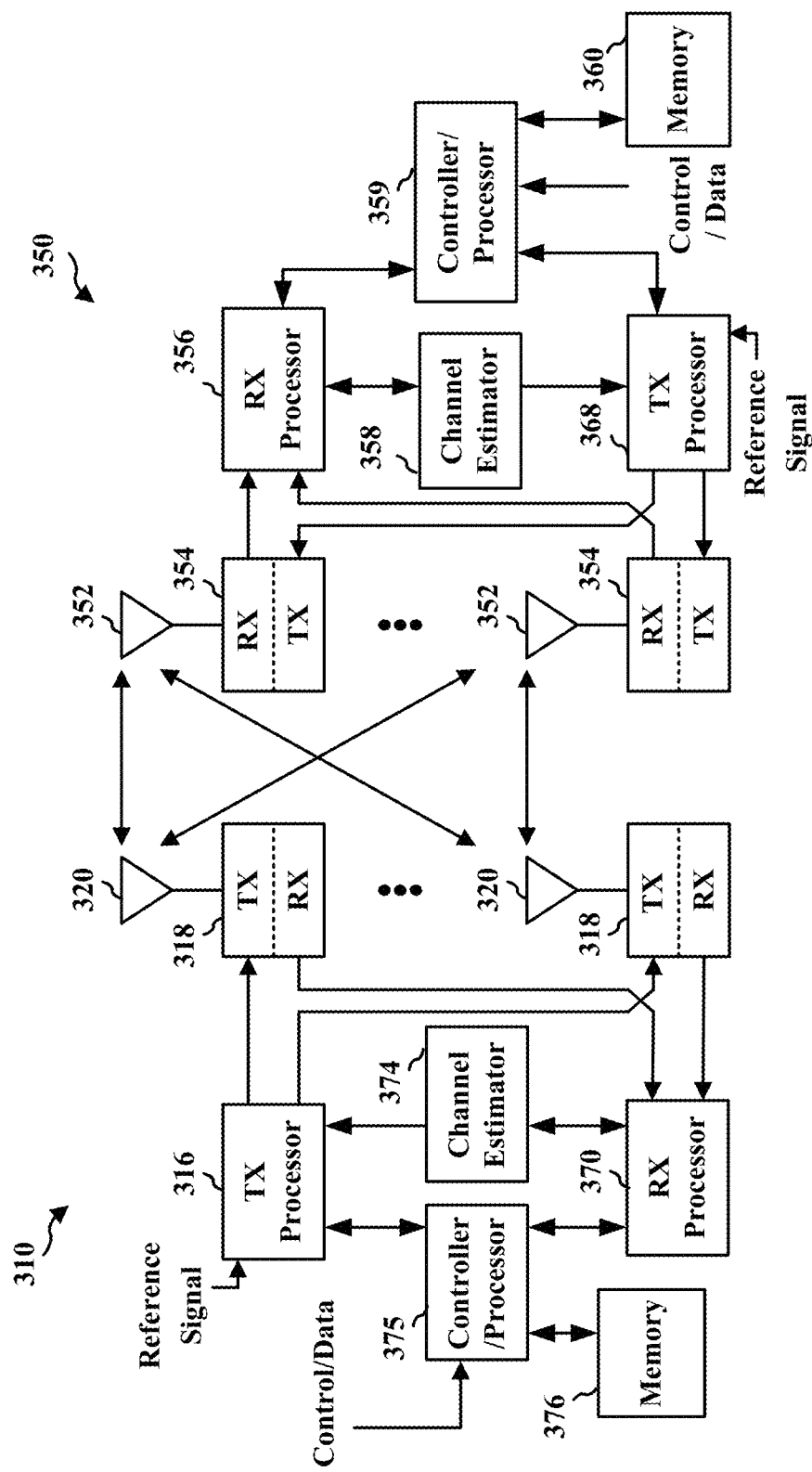
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BP SK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 199 of FIG. 1.

Transmission configuration indication (TCI) information can be used to indicate quasi-co location (QCL) relations for downlink transmissions. Two antenna ports are said to be quasi-co located if properties of the channel over which a symbol on one antenna port is conveyed can be inferred from the channel over which a symbol on the other antenna port is conveyed. A set of two QCL antenna ports may have a common set of QCL relations, such as one or more of Doppler shift, Doppler spread, average delay, delay spread, or a spatial Rx parameter. A UE may utilize the QCL relations of a pair of beams to infer information from one beam to another.

Some aspects of wireless communications can include a UE moving at a high rate of speed and communicating with a group of base stations or TRPs. In these situations, the UE moves at a high speed, so a group of base stations or TRPs may transmit the same data to the UE. The data transmission can be referred to as a single frequency network (SFN) transmission. In some aspects, these situations can include a high speed train single frequency network (HST-SFN), e.g., if a UE is on a high speed train. Some aspects of wireless communications for HST-SFNs can be utilized with conventional sub-6 GHz systems, e.g., LTE, NR, such as NR frequency range 1 (FR1), etc. In some instances, the base stations or TRPs may use pseudo-omni beams or digital beamforming. In these aspects, it may be sufficient for multiple TRPs to send the same data on the pseudo-omni beams, i.e., the SFN transmission. So the use of an SFN transmission may result in the UE receiving the transmitted data.

Some aspects of wireless communications for HST-SFNs can be utilized with millimeter wave (MMW) systems, e.g., NR frequency range 2 (FR2). Aspects of wireless communications for HST-SFNs can also utilize analog beamforming. In these aspects, analog Tx or Rx beams may be determined prior to data transmission or reception. When multiple beam pairs are used, the UE location may determine whether the two beam pairs are associated with the same TRP or different TRPs. In some instances, if the two beam pairs are associated with different TRPs, some properties may be different between the two beams. For example, these properties can include timing advance (TA) parameters and/or power control (PC) parameters in the uplink, as well as Doppler shift estimates in the downlink or uplink. So the UE may be located between two TRPs, where the UE receives multiple beams from both TRPs. If the UE is located near a single TRP, the UE may receive multiple beams from the same TRP.

Figure 4A:
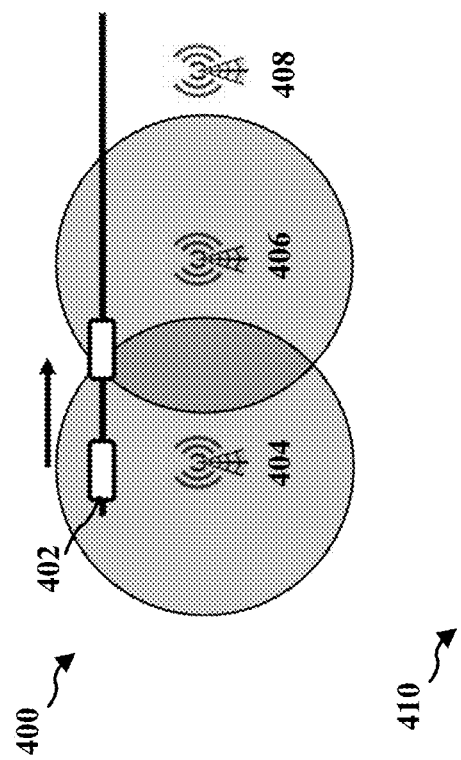
FIGS. 4A-4C are example diagrams of a TRP differentiation process in accordance with one or more techniques of the present disclosure.
Figure 4B:
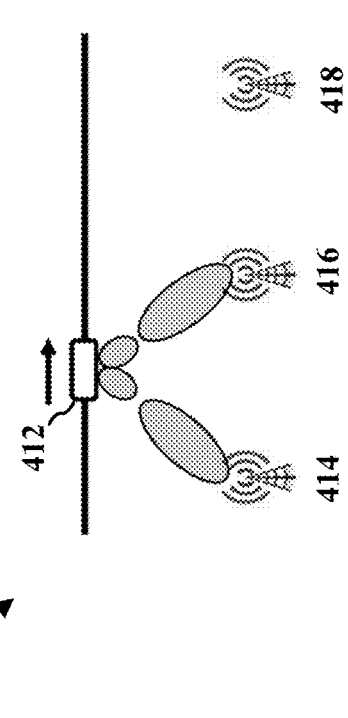
Figure 4C:
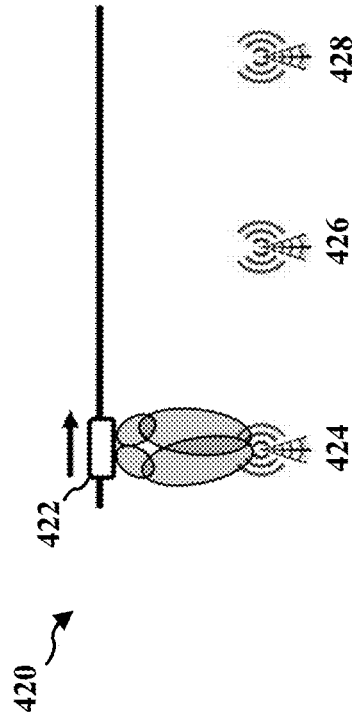

FIGS. 4A-4C are diagrams 400, 410, and 420, respectively, of a TRP differentiation process in accordance with one or more techniques of the present disclosure. As shown in FIG. 4A, diagram 400 includes UE 402, TRP 404, TRP 406, and TRP 408. In FIG. 4A, the UE 402 can be moving at a high rate of speed. FIG. 4A displays an example of when analog beamforming is not used, e.g., in LTE or NR FR1. For instance, UE 402 can utilize a simple SFN.

As shown in FIG. 4B, diagram 410 includes UE 412, TRP 414, TRP 416, and TRP 418. In FIG. 4B, UE 412 is moving at a high rate of speed and is between TRP 414 and 416. At this point, UE 412 is using one beam pair from TRP 414 and one beam pair from TRP 416. FIG. 4B displays that a UE, e.g., UE 412, can utilize different beam pairs from different TRPs, e.g., TRP 414 and TRP 416, when moving at a high rate of speed.

As shown in FIG. 4C, diagram 420 includes UE 422, TRP 424, TRP 426, and TRP 428. In FIG. 4C, UE 422 is moving at a high rate of speed and is near TRP 424. Here, UE 422 is using two beam pairs from the TRP 424. Accordingly, FIG. 4C displays that a UE, e.g., UE 422, can utilize different beam pairs from the same TRP, e.g., TRP 424, when moving at a high rate of speed.

As indicated above in FIGS. 4A-4C, a UE located between two TRPs may result in the UE receiving and/or transmitting multiple beams from both TRPs. Also, if a UE is located near a single TRP, the UE may receive and/or transmit multiple beams from the same TRP. As mentioned above, moving at a high rate of speed may cause the UE to switch coverage between TRPs. Additionally, switching between TRPs can result in an increase in the amount of power utilized and/or the amount of beam processing time, e.g., via beam sweeping. By reducing the amount of TRP switches, a UE can reduce the amount of power utilized and/or reduce the amount of beam processing time, e.g., via beam sweeping. Accordingly, it may be beneficial for UEs to differentiate the TRPs from which data is received, or to which data is transmitted.

Aspects of the present disclosure can allow a UE to differentiate the TRPs from which data is received, or to which data is transmitted. As such, UEs according to the present disclosure can determine whether multiple beam pairs are associated with different TRPs or the same TRP. So the UEs according to the present disclosure can differentiate TRPs for multiple transmitted beams. By differentiating TRPs, UEs herein may reduce the amount of switching between different TRPs. Thus, by differentiating the TRPs, UEs herein can reduce the amount of power utilized and/or reduce the amount of beam processing time, e.g., via beam sweeping, when switching between TRPs. The differentiation of TRPs can also improve decoding performance by exploiting the fact that the signals are sent from different TRPs, e.g., accurate Doppler shift estimate for downlink communications, and accurate TA or PC control for uplink communications. Additionally, aspects of the present disclosure can reduce the amount of beam sweeping time at each TRP. Also, if two adjacent TRPs have the same cell ID, the UE can differentiate between the two TRPs based on SSB grouping.

Aspects of the present disclosure can also utilize TRP differentiation based on SSB grouping information. As indicated above, by differentiating the TRPs with SSB grouping information, UEs according to the present disclosure can reduce the amount of power utilized and/or beam processing time, e.g., via beam sweeping, when switching between TRPs. In addition, each TRP can have either the same cell identifier (ID) or a different cell ID. So TRP differentiation herein can be applied when TRPs have the same cell ID and/or TRPs have a different cell ID. Further, TRP differentiation herein can be applied when all TRPs have the same cell ID. From the UE point of view, the signals from the TRPs can be different if the TRPs have the same cell IDs, so the UE may differentiate between the TRPs with the same cell ID.

Figure 5:
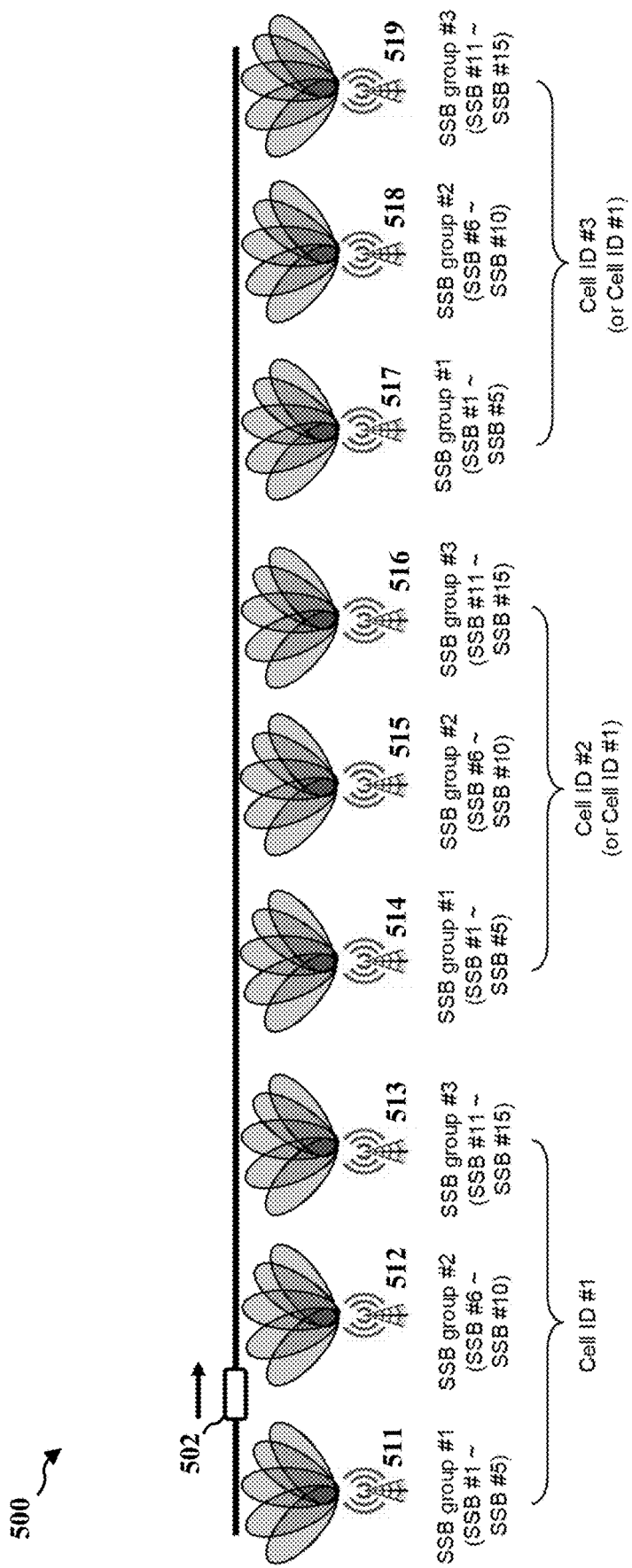
FIG. 5 is an example diagram of a TRP differentiation process in accordance with one or more techniques of the present disclosure.

FIG. 5 is diagram 500 of a TRP differentiation process in accordance with one or more techniques of the present disclosure. As shown in FIG. 5, diagram 500 includes UE 502, TRP 511, TRP 512, TRP 513, TRP 514, TRP 515, TRP 516, TRP 517, TRP 518, and TRP 519. In FIG. 5, the UE 502 can be moving at a high rate of speed across the coverage areas for TRPs 511-519. As the UE 502 moves across the coverages areas for the TRP s, the UE 502 can switch coverage areas and/or beams for TRPs 511-519. As displayed in FIG. 5, TRPs 511-513 can each include the same cell ID, e.g., cell ID 1. Also, TRPs 514-516 can each include the same cell ID, e.g., cell ID 2. Moreover, TRPs 517-519 can each include the same cell ID, e.g., cell ID 3. In some aspects, all the TRPs (TRPs 511-519) can have the same cell ID, e.g., cell ID 1. As TRP 513 and TRP 514 have different cell IDs, e.g., cell IDs 1 and 2 respectively, then UE 502 may switch between TRPs 513 and 514.

FIG. 5 displays that groups of SSBs can include different cell IDs or the same cell IDs. As shown in FIG. 5, for cell ID 1, there can be 15 SSBs, e.g., SSBs 1-15. For example, SSB group 1 can include SSB 1-SSB 5, SSB group 2 can include SSB 6-SSB 10, and SSB group 3 can include SSB 11-SSB 15. The different SSBs can be associated with different transmit beams from the corresponding TRP or base station, e.g., SSB 1-SSB 5 are associated with TRPs 511, 514, and 517. Also, SSB 6-SSB 10 are associated with TRPs 512, 515, and 518, and SSB 11-SSB 15 are associated with TRPs 513, 516, and 519. As such, a TRP or base station can transmit beams 1-5, and SSBs 1-5 can correspond to each of these five beams. So the different transmit beams can be split into different SSB groups.

In some aspects, the SSBs can be grouped into a certain amount of groups, e.g., N groups. Additionally, one TRP can be associated with one SSB group. As such, the UE can differentiate TRPs sending data based on SSB grouping information. The UE can also differentiate TRPs sending data based on transmission configuration indication (TCI) information or quasi co-location (QCL) information. In some instances, the SSB grouping information can be sent from the TRP or base station to the UE via system information (SI) or RRC signaling. The SSB grouping information sent via the RRC signaling may be long-term information that is not updated frequently. Also, if the TRP or base station communicates with the UE by using multiple Tx beams in the downlink (or multiple Rx beams in the uplink), the TRP or base station can inform the UE of which Tx beams (or Rx beams) are used based on TCI information or QCL information via DCI. In some instances, the beam forming information related to the SSBs and/or TCI information or QCL information can be sent via the DCI and be short-term information that is updated frequently.

Additionally, based on the TCI information or QCL information along with the SSB grouping information, the UE can determine whether the data is transmitted to or received from different TRPs or the same TRP. So the UE can use long-term information, e.g., via RRC signaling, and/or short-term information, e.g., via DCI, to determine whether the data is transmitted to or received from different TRPs or the same TRP. Moreover, the UE can use the information to decode the downlink data or to transmit the uplink data. In downlink cases, if the data is transmitted from different TRPs, the UE can estimate a Doppler shift for each Tx-Rx beam pair separately. In uplink cases, if the data is intended to be received by different TRPs, the UE can use different timing advance (TA) parameters and/or power control (PC) parameters for each Tx-Rx beam pair separately.

As mentioned above, SSB grouping information can be transmitted from the TRP or base station to the UE in the long-term, e.g., via RRC signaling. For instance, the SSB grouping information can include which SSBs are assigned to which SSB groups, e.g., SSB group 1=SSB 1-SSB 5, SSB group 2=SSB 6-SSB 10, and SSB group 3=SSB 11-SSB 15.

Further, the TCI information or QCL information can be transmitted from the TRP or base station to the UE in the short-term, e.g., via DCI.

In some aspects, when multiple beam pairs are from the same TRP, the UE can use the same beam parameters for the TRP differentiation process, e.g., TA or PC parameters for uplink and Doppler shift estimates for downlink. For example, TCI 2 can correspond to QCL type D with SSB 2, and TCI 3 can correspond to QCL type D with SSB 3. By doing so, the UE can determine that SSB 2 and SSB 3 are in the same SSB group, e.g., SSB group 1. Accordingly, the UE can determine or differentiate that the beams associated with SSB 2 and SSB 3 are from the same TRP.

In some instances, when multiple beam pairs are from different TRPs, the UE can use different beam parameters for the TRP differentiation process, e.g., TA or PC parameters for uplink and Doppler shift estimates for downlink. For example, TCI 5 can correspond to QCL type D with SSB 5, and TCI 6 can correspond to QCL type D with SSB 6. By doing so, the UE can determine that SSB 5 and SSB 6 are in different SSB groups, e.g., SSB groups 1 and 2, respectively. Therefore, the UE can determine or differentiate that the beams associated with SSB 5 and SSB 6 are from different TRPs. Based on this, if the TCI and corresponding SSBs are sent in DCI, then the UE can determine that the beams associated with the SSBs are from different TRPs.

As indicated above, the SSB grouping information can be long-term information that is sent via RRC signaling. Also, the TCI information or QCL information can be short-term information that is sent via DCI and updated more frequently. So the TCI information or QCL information can be constantly updated, while the SSB grouping information can be sent less frequently.

Additionally, there can be several different types of QCL information, e.g., QCL type A, QCL type B, QCL type C, and QCL type D. Each of these QCL types can be associated with analog Tx or Rx beams. In some instances, QCL type D can be relevant to the TRP differentiation processes herein. Further, in some aspects, the source for a TCI state can be a corresponding SSB, while the target for a TCI state can be the PDSCH associated with the TCI information.

In some aspects, the attributes of SSBs in a SSB group can be repeated in each SSB group. Based on this, the UE can exploit the information during the TRP differentiation process. One example of the attributes of SSBs is a transmit beam pattern with respect to a corresponding TRP. Accordingly, a TRP can transmit different SSBs with different attributes.

Figure 6:
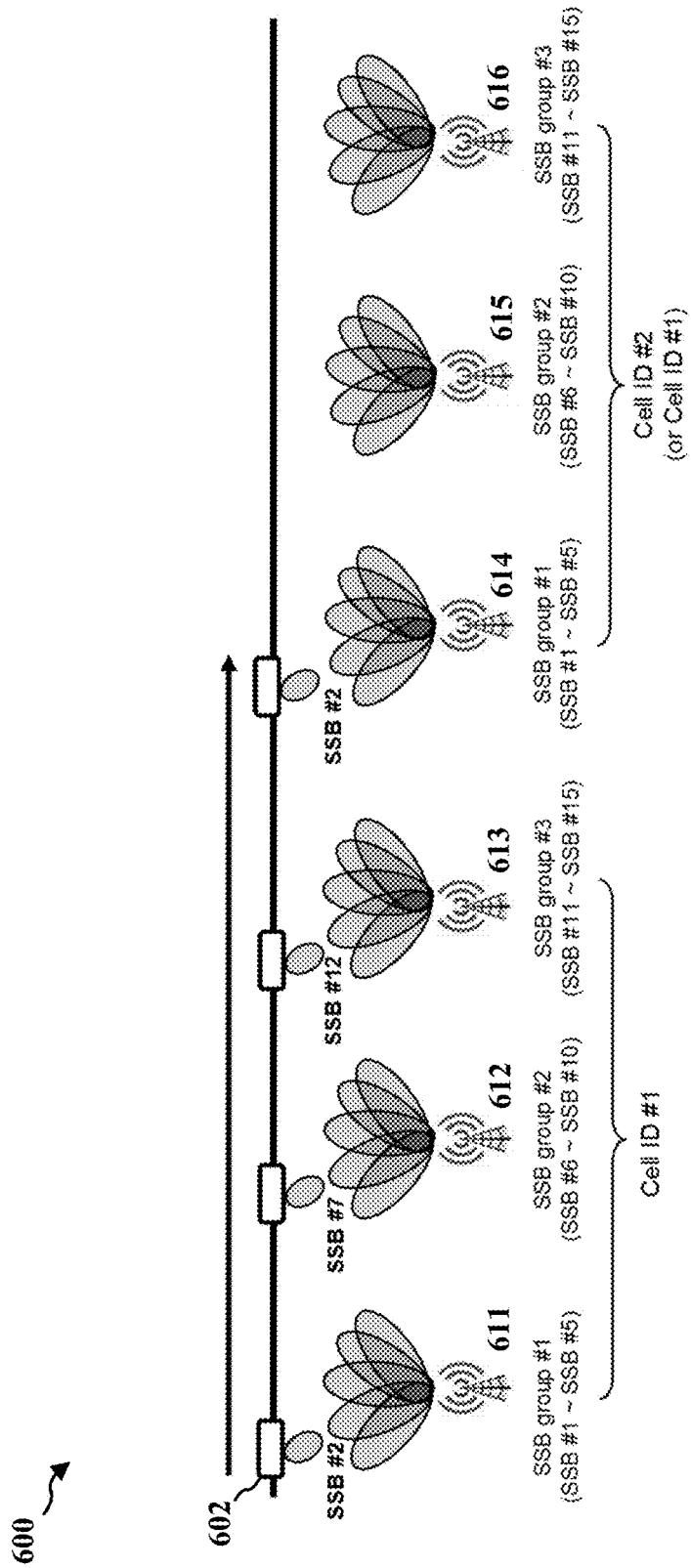
FIG. 6 is an example diagram of a TRP differentiation process in accordance with one or more techniques of the present disclosure.

FIG. 6 is diagram 600 of a TRP differentiation process in accordance with one or more techniques of the present disclosure. As shown in FIG. 6, diagram 600 includes UE 602 and TRPs 611-616. In diagram 600, UE 602 can be moving at a high rate of speed across the coverage areas for TRPs 611-616. As the UE 602 moves across the coverages areas for the TRPs, the UE 602 can switch coverage areas and/or beams for TRPs 611-616. As displayed in FIG. 6, TRPs 611-613 can each include the same cell ID, e.g., cell ID 1. Also, TRPs 614-616 can each include the same cell ID, e.g., cell ID 2. In some aspects, TRPs 614-616 can include cell ID 1. As TRP 613 and TRP 614 have different cell IDs, e.g., cell IDs 1 and 2 respectively, UE 602 may switch between TRPs 613 and 614.

FIG. 6 also displays that groups of SSBs can include different cell IDs or the same cell IDs. As shown in FIG. 6, cell ID 1 can include 15 SSBs, e.g., SSBs 1-15. For example, SSB group 1 can include SSB 1-SSB 5, SSB group 2 can include SSB 6-SSB 10, and SSB group 3 can include SSB 11-SSB 15. The different SSBs can be associated with different transmit beams from the corresponding TRP or base station, e.g., SSB 1-SSB 5 are associated with TRPs 611 and 614. Also, SSB 6-SSB 10 are associated with TRPs 612 and 615, while SSB 11-SSB 15 are associated with TRPs 613 and 616.

Additionally, each SSB can be associated with a number of attributes. As shown in FIG. 6, some SSBs in different SSB groups can be similar and/or associated with the same attributes. For example, in FIG. 6, SSB 2, SSB 7, and SSB 12 in SSB groups 1, 2, and 3, respectively, can be similar and/or associated with the same attribute. Further, these SSBs can be associated with similar beams in their respective TRPs. As such, SSB 2, SSB 7, and SSB 12 can be associated with similar beams in TRPs 611, 612, and 613, respectively. Based on this, as UE 602 moves from TRP 611 to TRP 612 to TRP 613, the UE 602 can utilize the beams corresponding to SSB 2, SSB 7, and SSB 12. Further, as UE 602 moves from TRP 614 to TRP 615 to TRP 616, the UE 602 can utilize the beams corresponding to SSB 2, SSB 7, and SSB 12, respectively.

TABLE 1

|  | Attribute #1 | Attribute #2 | Attribute #3 | Attribute #4 | Attribute #5 |
| --- | --- | --- | --- | --- | --- |
| SSB group #1 | SSB #1 | SSB #2 | SSB #3 | SSB #4 | SSB #5 |
| SSB group #2 | SSB #6 | SSB #7 | SSB #8 | SSB #9 | SSB #10 |
| SSB group #3 | SSB #11 | SSB #12 | SSB #13 | SSB #14 | SSB #15 |

As shown in Table 1 above, each SSB group can include multiple attributes, e.g., attributes 1-5, that are associated with individual SSBs. Also, some SSBs can be associated with the same attributes as other SSBs. For example, SSB group 1 can include SSB 1 associated with attribute 1, SSB 2 associated with attribute 2, SSB 3 associated with attribute 3, SSB 4 associated with attribute 4, and SSB 5 associated with attribute 5. Also, SSB group 2 can include SSB 6 associated with attribute 1, SSB 7 associated with attribute 2, SSB 8 associated with attribute 3, SSB 9 associated with attribute 4, and SSB 10 associated with attribute 5. Further, SSB group 3 can include SSB 11 associated with attribute 1, SSB 12 associated with attribute 2, SSB 13 associated with attribute 3, SSB 14 associated with attribute 4, and SSB 15 associated with attribute 5.

As shown in Table 1 above, SSBs 1, 6, and 11 can be associated with the same attribute, e.g., attribute 1. Also, SSBs 2, 7, and 12 can be associated with attribute 2. SSBs 3, 8, and 13 can be associated with attribute 3. And SSBs 4, 9, and 14 can be associated with attribute 4. In addition, SSBs 5, 10, and 15 can be associated with attribute 5. Based on this, the UE can assume that the same beam for similar SSBs, e.g., SSBs 2, 7, and 12, can be used for PDSCH decoding.

Additionally, if TCI information in the PDSCH or PDCCH indicates that it is quasi co-located with certain SSBs, e.g., SSB 2, SSB 7, or SSB 12, the UE can assume that the same analog Rx beam can be used for the PDSCH or PDCCH. Accordingly, an analog Rx beam for the PDSCH or PDCCH that is quasi co-located with SSB 2 is the same as the analog Rx beam for the PDSCH or PDCCH that is quasi co-located with SSB 7, which is the same as the analog Rx beam for the PDSCH or PDCCH that is quasi co-located with SSB 12.

In some aspects, if the UE has determined the best analog Rx beam for SSB 2, but it has not determined the best analog Rx beam for SSB 7 and SSB 12, the UE can use the best analog Rx beam for SSB 2 to decode the PDSCH or PDCCH that is quasi co-located with SSB 7 or 12. So if the TRP or base station sends the PDSCH to the UE, the TRP or base station can indicate that the analog beam for the PDSCH is associated with a certain SSB, e.g., SSB 2. The UE can then determine the best analog beam associated with the SSB, e.g., SSB 2, to decode the PDSCH. Accordingly, the UE may determine the best beam for a certain SSB to decode the PDSCH, and it can use this beam to decode the PDSCH that are quasi co-located with corresponding SSBs.

In some instances, the UE can determine the best analog Rx beam by jointly considering a group of SSBs, e.g., SSB 2, SSB 7, and SSB 12, so the UE may not independently consider a certain SSB. As such, the UE can determine a beam to decode the PDSCH based on a group SSB consideration. By doing so, the UE can utilize the same beam for multiple SSBs after jointly considering the group of SSBs. And the UE can perform beam sweeping for one SSB, e.g., SSB 2, and then assume the beam sweeping for the corresponding SSBs, e.g., SSB 7 and SSB 12. This can be helpful in cases where the UE is moving at a fast pace, as the beam sweeping may take a long period of time, so the UE may not have enough time to perform the beam sweeping for multiple SSBs. So the UE can utilize the same beam sweeping procedure for multiple TRPs.

Figure 7:
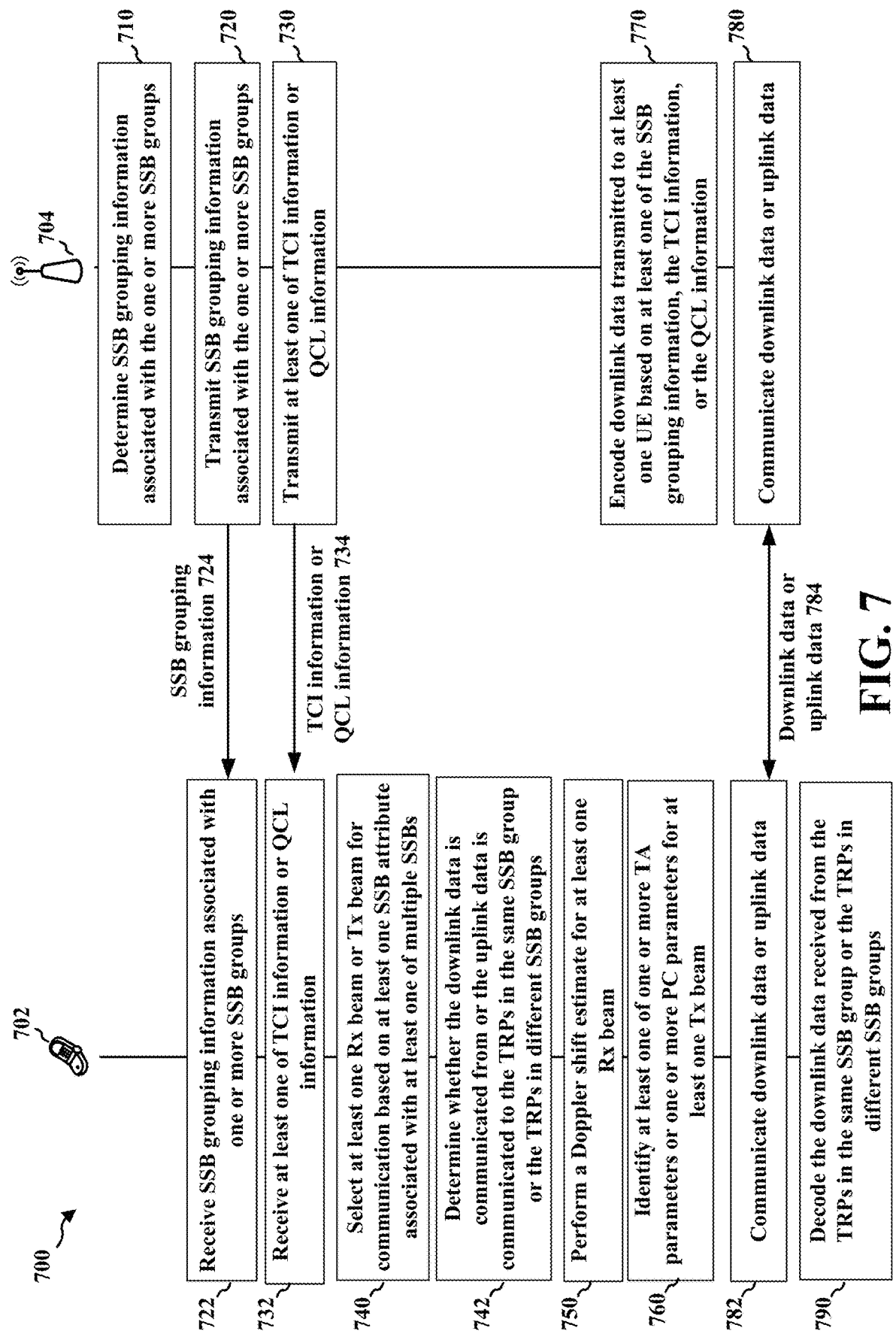
FIG. 7 is a diagram illustrating example communication between a UE and a base station or TRP in accordance with one or more techniques of the present disclosure.

FIG. 7 is a diagram 700 illustrating example communication between a UE 702 and a base station or TRP 704. At 710, the base station 704 may determine SSB grouping information associated with one or more SSB groups. At 720, base station 704 may transmit SSB grouping information, e.g., SSB grouping information 724, associated with one or more SSB groups, where each of the one or more SSB groups can include one or more TRPs. At 722, UE 702 can receive SSB grouping information, e.g., SSB grouping information 724, associated with one or more SSB groups, where each of the one or more SSB groups can include one or more TRPs.

At 730, the base station 704 may transmit at least one of TCI information or QCL information, e.g., TCI information or QCL information 734, where each of the TCI information and the QCL information can indicate an SSB of the one or more SSB groups that is associated with a downlink Tx beam for downlink data or an uplink Rx beam for uplink data. At 732, UE 702 can receive at least one of TCI information or QCL information, e.g., TCI information or QCL information 734, where each of the TCI information and the QCL information can indicate an SSB of the one or more SSB groups that is associated with a downlink Tx beam for downlink data or an uplink Rx beam for uplink data. In some aspects, the TCI information can be associated with one or more TCIs, where each of the one or more TCIs can correspond to at least one of a QCL type or an SSB, where the TCI information can indicate the SSB associated with the downlink Tx beam or the uplink Rx beam. Based on 722 and 732, the UE can determine whether the TRPs are the same or different.

In some aspects, each of the one or more SSB groups can include multiple SSBs. Also, each of the multiple SSBs in the one or more SSB groups can be associated with an SSB attribute. In some instances, the SSB attributes associated with the multiple SSBs in one of the one or more SSB groups can be equivalent to the SSB attributes associated with the multiple SSBs in each of the one or more SSB groups. Additionally, one of the SSB attributes associated with one of the multiple SSBs can be a Tx beam pattern of the SSB.

At 740, UE 702 can select at least one Rx beam or Tx beam for communication based on at least one SSB attribute associated with at least one of the multiple SSBs. In some aspects, the at least one Rx beam or Tx beam can be selected based on an SSB attribute associated with an SSB in one of the one or more SSB groups or based on an SSB attribute associated with multiple SSBs in each of the one or more SSB groups. At 742, UE 702 may determine whether downlink data is communicated from or the uplink data is communicated to the TRPs in the same SSB group of the one or more SSB groups or the TRPs in different SSB groups of the one or more SSB groups based on at least one of the SSB grouping information, the TCI information, or the QCL information.

At 750, UE 702 may perform a Doppler shift estimate for at least one downlink Tx-Rx beam pair, where the downlink data can be communicated from the TRPs in the same SSB group or the TRPs in different SSB groups based on the Doppler shift estimate. In some aspects, the Doppler shift estimate can be performed separately for each of the at least one downlink Tx-Rx beam pair when the downlink data is communicated from the TRPs in different SSB groups. At 760, UE 702 may identify at least one of one or more TA parameters or one or more PC parameters for at least one Tx beam, where the uplink data can be communicated to the TRPs in the same SSB group or the TRPs in different SSB groups based on at least one of the one or more TA parameters or the one or more PC parameters. In some aspects, at least one of the one or more TA parameters or the one or more PC parameters can be identified separately for each of the at least one Tx beam when the uplink data is communicated to the TRPs in different SSB groups. Based on the determination of whether the TRPs are the same or different, the UE can determine how to perform 750 and 760, e.g., jointly for the same TRP or separately for different TRPs.

At 770, base station 704 may encode downlink data transmitted to the at least one UE, e.g., UE 702, based on at least one of the SSB grouping information, the TCI information, or the QCL information.

At 780, base station 704 may communicate the downlink data to or the uplink data from, e.g., downlink data or uplink data 784, at least one UE, e.g., UE 702, based on at least one of the SSB grouping information, the TCI information, or the QCL information. Base station 704 may also transmit the downlink data to or receive the uplink data from, e.g., downlink data or uplink data 784, the at least one UE based on at least one of the SSB grouping information, the TCI information, or the QCL information. At 782, UE 702 may communicate downlink data from or uplink data to, e.g., downlink data or uplink data 784, TRPs in a same SSB group of the one or more SSB groups or TRPs in different SSB groups of the one or more SSB groups based on at least one of the SSB grouping information, the TCI information, or the QCL information. UE 702 can also receive the downlink data from or transmit the uplink data to, e.g., downlink data or uplink data 784, the TRPs in the same SSB group of the one or more SSB groups or the TRPs in different SSB groups of the one or more SSB groups based on at least one of the SSB grouping information, the TCI information, or the QCL information.

At 790, UE 702 may decode the downlink data received from the TRPs in the same SSB group of the one or more SSB groups or the TRPs in different SSB groups of the one or more SSB groups based on at least one of the SSB grouping information, the TCI information, or the QCL information. In some aspects, the SSB grouping information can be received via system information (SI) or radio resource control (RRC) signaling. Also, at least one of the TCI information or the QCL information can be received via downlink control information (DCI). In some instances, the downlink data can be communicated via a PDSCH or a PDCCH and the uplink data is communicated via a PUSCH or a PUCCH.

Figure 8:
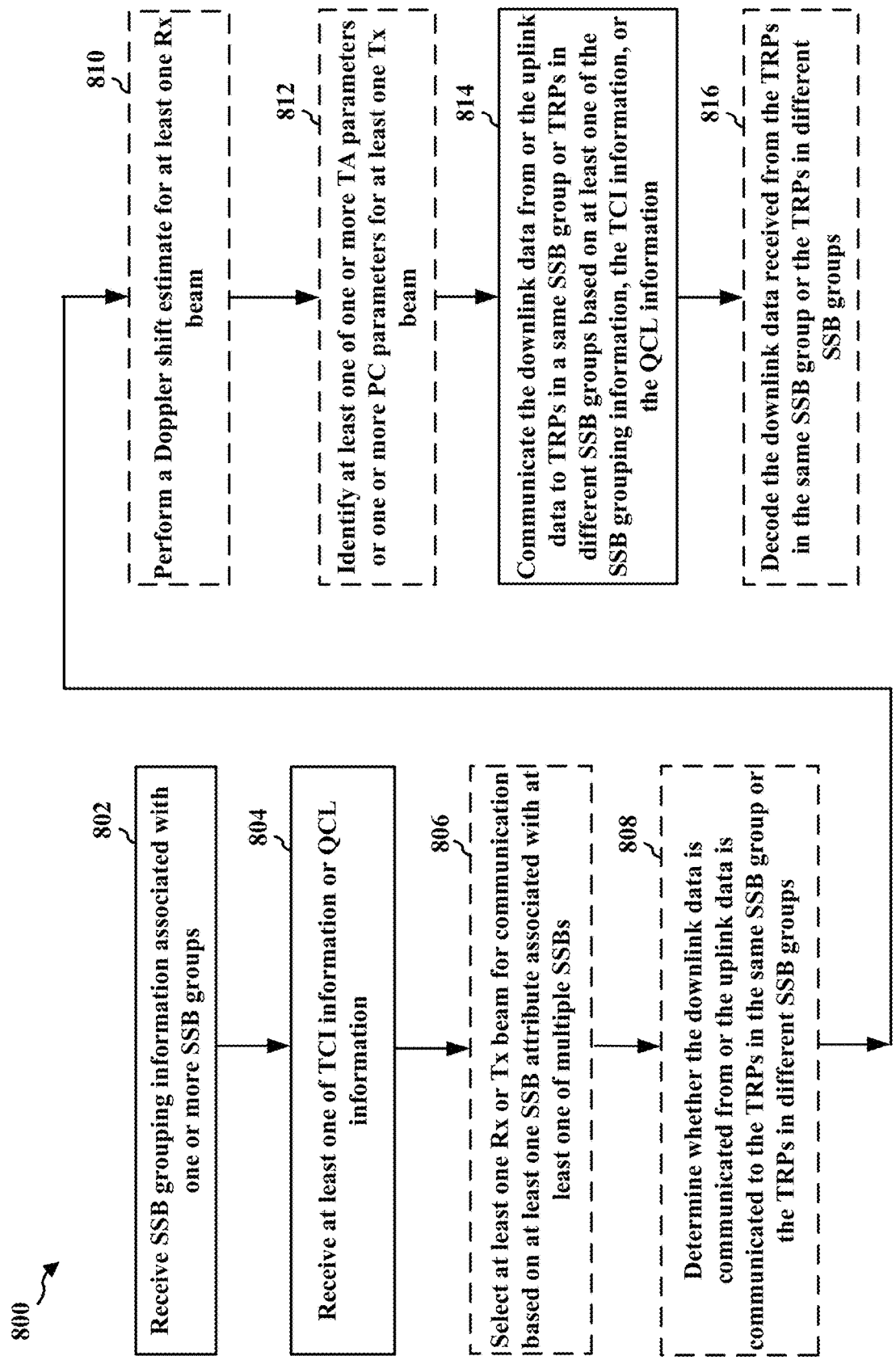
FIG. 8 is a flowchart of a method of wireless communication in accordance with one or more techniques of the present disclosure.

FIG. 8 is a flowchart 800 of a method of wireless communication. The method may be performed by a UE or a component of a UE (e.g., the UE 104, 350, 702; the apparatus 1002; a processing system, which may include the memory 360 and which may be the entire UE or a component of the UE, such as the TX processor 368, the RX processor 356, and/or the controller/processor 359). Optional aspects are illustrated with a dashed line. The methods described herein can provide a number of benefits, such as improving communication signaling, resource utilisation, and/or power savings.

At 802, the UE may receive SSB grouping information associated with one or more SSB groups, where each of the one or more SSB groups can include one or more TRPs, as described in connection with the examples in FIGS. 4A-7. For example, as described in 722 of FIG. 7, UE 702 may receive SSB grouping information 724 from base station 704. SSB grouping information 724 may be associated with one or more SSB groups, where each of the one or more SSB groups can include one or more TRPs. As shown in FIG. 6, the SSB groups may correspond to any of SSB groups 1-3 associated with TRPs 611-616. Further, 802 may be performed by determination component 1040 from FIG. 10.

At 804, UE can receive at least one of TCI information or QCL information, where each of the TCI information and the QCL information can indicate an SSB of the one or more SSB groups that is associated with a downlink Tx beam for downlink data or an uplink Rx beam for uplink data, as described in connection with the examples in FIGS. 4A-7. For example, as described in 732 of FIG. 7, UE 702 may receive at least one of TCI information or QCL information 734 from base station 704. Further, 804 may be performed by determination component 1040 from FIG. 10. In some aspects, the TCI information can be associated with one or more TCIs, where each of the one or more TCIs can correspond to at least one of a QCL type or an SSB, where the TCI information can indicate the SSB associated with the downlink Tx beam or the uplink Rx beam, as described in connection with the examples in FIGS. 4A-7.

In some aspects, each of the one or more SSB groups can include multiple SSBs. Also, each of the multiple SSBs in the one or more SSB groups can be associated with an SSB attribute, as described in connection with the examples in FIGS. 4A-7. In some instances, the SSB attributes associated with the multiple SSBs in one of the one or more SSB groups can be equivalent to the SSB attributes associated with the multiple SSBs in each of the one or more SSB groups, as described in connection with the examples in FIGS. 4A-7. Additionally, one of the SSB attributes associated with one of the multiple SSBs can be a Tx beam pattern of the SSB, as described in connection with the examples in FIGS. 4A-7.

At 806, the UE can select at least one Rx beam or Tx beam for communication based on at least one SSB attribute associated with at least one of the multiple SSBs, as described in connection with the examples in FIGS. 4A-7. For example, as described in 740 of FIG. 7, UE 702 may select at least one Rx beam or Tx beam for communication based on at least one SSB attribute associated with at least one of the multiple SSBs. Further, 806 may be performed by determination component 1040 from FIG. 10. In some aspects, the at least one Rx beam or Tx beam can be selected based on an SSB attribute associated with an SSB in one of the one or more SSB groups or based on an SSB attribute associated with multiple SSBs in each of the one or more SSB groups, as described in connection with the examples in FIGS. 4A-7.

At 808, the UE may determine whether downlink data is communicated from or the uplink data is communicated to the TRPs in the same SSB group of the one or more SSB groups or the TRPs in different SSB groups of the one or more SSB groups based on at least one of the SSB grouping information, the TCI information, or the QCL information, as described in connection with the examples in FIGS. 4A-7. For example, as described in 742 of FIG. 7, UE 702 may determine whether downlink data is communicated from or the uplink data is communicated to the TRPs in the same SSB group of the one or more SSB groups or the TRPs in different SSB groups of the one or more SSB groups based on at least one of the SSB grouping information, the TCI information, or the QCL information. Further, 808 may be performed by determination component 1040 from FIG. 10.

At 810, the UE may perform a Doppler shift estimate for at least one downlink Tx-Rx beam pair, where the downlink data can be communicated from the TRPs in the same SSB group or the TRPs in different SSB groups based on the Doppler shift estimate, as described in connection with the examples in FIGS. 4A-7. For example, as described in 750 of FIG. 7, UE 702 may perform a Doppler shift estimate for at least one downlink Tx-Rx beam pair, where the downlink data can be communicated from the TRPs in the same SSB group or the TRPs in different SSB groups based on the Doppler shift estimate. Further, 810 may be performed by determination component 1040 from FIG. 10. In some aspects, the Doppler shift estimate can be performed separately for each of the at least one downlink Tx-Rx beam pair when the downlink data is communicated from the TRPs in different SSB groups, as described in connection with the examples in FIGS. 4A-7.

At 812, the UE may identify at least one of one or more TA parameters or one or more PC parameters for at least one Tx beam, where the uplink data can be communicated to the TRPs in the same SSB group or the TRPs in different SSB groups based on at least one of the one or more TA parameters or the one or more PC parameters, as described in connection with the examples in FIGS. 4A-7. For example, as described in 760 of FIG. 7, UE 702 may identify at least one of one or more TA parameters or one or more PC parameters for at least one Tx beam. Further, 812 may be performed by determination component 1040 from FIG. 10. In some aspects, at least one of the one or more TA parameters or the one or more PC parameters can be identified separately for each of the at least one Tx beam when the uplink data is communicated to the TRPs in different SSB groups, as described in connection with the examples in FIGS. 4A-7.

At 814, the UE may communicate downlink data from or uplink data to TRPs in a same SSB group of the one or more SSB groups or TRPs in different SSB groups of the one or more SSB groups based on at least one of the SSB grouping information, the TCI information, or the QCL information, as described in connection with the examples in FIGS. 4A-7. For example, as described in 782 of FIG. 7, UE 702 may communicate downlink data from or uplink data to TRPs in a same SSB group of the one or more SSB groups or TRPs in different SSB groups of the one or more SSB groups based on at least one of the SSB grouping information, the TCI information, or the QCL information. Further, 814 may be performed by determination component 1040 from FIG. 10. The UE can also receive the downlink data from or transmit the uplink data to the TRPs in the same SSB group of the one or more SSB groups or the TRPs in different SSB groups of the one or more SSB groups based on at least one of the SSB grouping information, the TCI information, or the QCL information, as described in connection with the examples in FIGS. 4A-7.

At 816, the UE may decode the downlink data received from the TRPs in the same SSB group of the one or more SSB groups or the TRPs in different SSB groups of the one or more SSB groups based on at least one of the SSB grouping information, the TCI information, or the QCL information, as described in connection with the examples in FIGS. 4A-7. For example, as described in 790 of FIG. 7, UE 702 may decode the downlink data received from the TRPs in the same SSB group of the one or more SSB groups or the TRPs in different SSB groups of the one or more SSB groups based on at least one of the SSB grouping information, the TCI information, or the QCL information. Further, 816 may be performed by determination component 1040 from FIG. 10. In some aspects, the SSB grouping information can be received via system information (SI) or radio resource control (RRC) signaling, as described in connection with the examples in FIGS. 4A-7. Also, at least one of the TCI information or the QCL information can be received via downlink control information (DCI), as described in connection with the examples in FIGS. 4A-7. In some instances, the downlink data can be communicated via a PDSCH or a PDCCH and the uplink data is communicated via a PUSCH or a PUCCH, as described in connection with the examples in FIGS. 4A-7.

Figure 9:
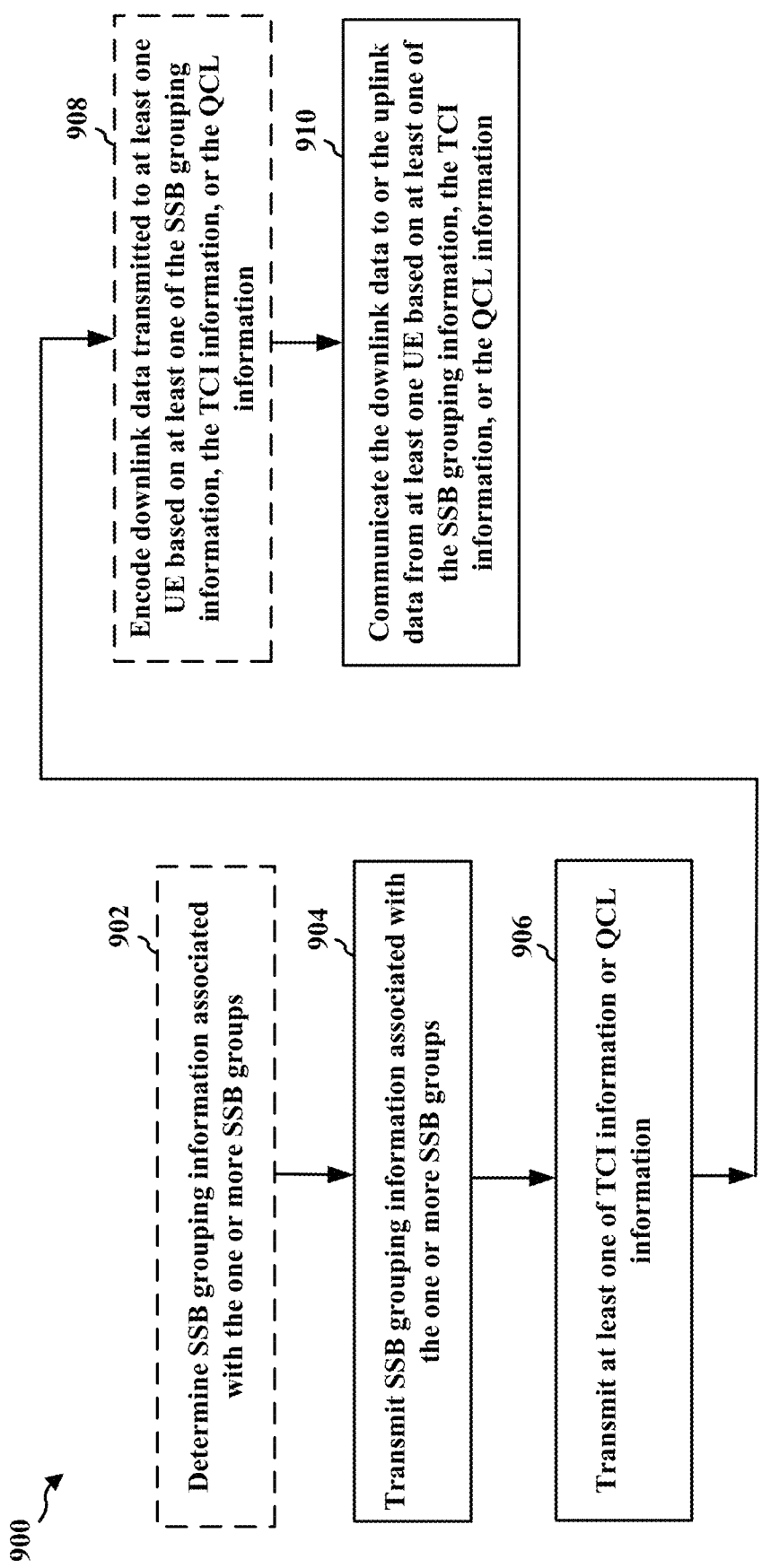
FIG. 9 is a flowchart of a method of wireless communication in accordance with one or more techniques of the present disclosure.

FIG. 9 is a flowchart 900 of a method of wireless communication. The method may be performed by a base station or TRP or a component of a base station or TRP (e.g., the base station 102, 310, 704; the apparatus 1102; a processing system, which may include the memory 376 and which may be the entire base station or a component of the base station, such as the TX processor 316, the RX processor 370, and/or the controller/processor 375). Optional aspects are illustrated with a dashed line. The methods described herein can provide a number of benefits, such as improving communication signaling, resource utilisation, and/or power savings.

At 902, the base station or TRP may determine SSB grouping information associated with one or more SSB groups, as described in connection with the examples in FIGS. 4A-7. For example, as described in 710 of FIG. 7, base station 704 may determine SSB grouping information associated with one or more SSB groups. As shown in FIG. 6, the SSB groups may correspond to any of SSB groups 1-3 associated with TRPs 611-616. Further, 902 may be performed by determination component 1140 from FIG. 11.

At 904, the base station may transmit SSB grouping information associated with one or more SSB groups, where each of the one or more SSB groups can include one or more TRPs, as described in connection with the examples in FIGS. 4A-7. For example, as described in 720 of FIG. 7, base station 704 may transmit SSB grouping information 724 associated with one or more SSB groups to UE 702. Further, 904 may be performed by determination component 1140 from FIG. 11.

At 906, the base station may transmit at least one of TCI information or QCL information, where each of the TCI information and the QCL information can indicate an SSB of the one or more SSB groups that is associated with a downlink Tx beam for downlink data or an uplink Rx beam for uplink data, as described in connection with the examples in FIGS. 4A-7. For example, as described in 730 of FIG. 7, base station 704 may transmit at least one of TCI information or QCL information 734 to UE 702. Further, 906 may be performed by determination component 1140 from FIG. 11. In some aspects, the TCI information can be associated with one or more TCIs, where each of the one or more TCIs can correspond to at least one of a QCL type or an SSB, where the TCI information can indicate the SSB associated with the downlink Tx beam or the uplink Rx beam, as described in connection with the examples in FIGS. 4A-7.

In some aspects, each of the one or more SSB groups can include multiple SSBs, as described in connection with the examples in FIGS. 4A-7. Also, each of the multiple SSBs in the one or more SSB groups can be associated with an SSB attribute, as described in connection with the examples in FIGS. 4A-7. In some instances, the SSB attributes associated with the multiple SSBs in one of the one or more SSB groups can be equivalent to the SSB attributes associated with the multiple SSBs in each of the one or more SSB groups, as described in connection with the examples in FIGS. 4A-7. Additionally, one of the SSB attributes associated with one of the multiple SSBs can be a Tx beam pattern of the SSB, as described in connection with the examples in FIGS. 4A-7.

Also, at least one Rx beam can be used for communication based on at least one SSB attribute associated with at least one of the multiple SSBs, as described in connection with the examples in FIGS. 4A-7. In some aspects, the at least one Rx beam can be used for communication based on an SSB attribute associated with an SSB in one of the one or more SSB groups or based on an SSB attribute associated with multiple SSBs in each of the one or more SSB groups, as described in connection with the examples in FIGS. 4A-7. In some aspects, downlink data can be communicated to the at least one UE based on a Doppler shift estimate for at least one downlink Tx-Rx beam pair, as described in connection with the examples in FIGS. 4A-7. In some aspects uplink data can be communicated from the at least one UE based on one or more timing advance (TA) parameters or one or more power control (PC) parameters for at least one Tx beam, as described in connection with the examples in FIGS. 4A-7.

At 908, the base station may encode downlink data transmitted to the at least one UE based on at least one of the SSB grouping information, the TCI information, or the QCL information, as described in connection with the examples in FIGS. 4A-7. For example, as described in 770 of FIG. 7, base station 704 may encode downlink data transmitted to the at least one UE based on at least one of the SSB grouping information, the TCI information, or the QCL information. Further, 908 may be performed by determination component 1140 from FIG. 11.

At 910, the base station can communicate the downlink data to or the uplink data from at least one UE based on at least one of the SSB grouping information, the TCI information, or the QCL information, as described in connection with the examples in FIGS. 4A-7. For example, as described in 780 of FIG. 7, base station 704 may communicate the downlink data to or the uplink data from at least one UE based on at least one of the SSB grouping information, the TCI information, or the QCL information. Further, 910 may be performed by determination component 1140 from FIG. 11. The base station may also transmit the downlink data to or receive the uplink data from the at least one UE based on at least one of the SSB grouping information, the TCI information, or the QCL information, as described in connection with the examples in FIGS. 4A-7.

In some aspects, the SSB grouping information can be transmitted via system information (SI) or radio resource control (RRC) signaling, as described in connection with the examples in FIGS. 4A-7. Also, at least one of the TCI information or the QCL information can be transmitted via downlink control information (DCI), as described in connection with the examples in FIGS. 4A-7. In some instances, the downlink data can be communicated via a PDSCH or a PDCCH and the uplink data is communicated via a PUSCH or a PUCCH, as described in connection with the examples in FIGS. 4A-7.

Figure 10:
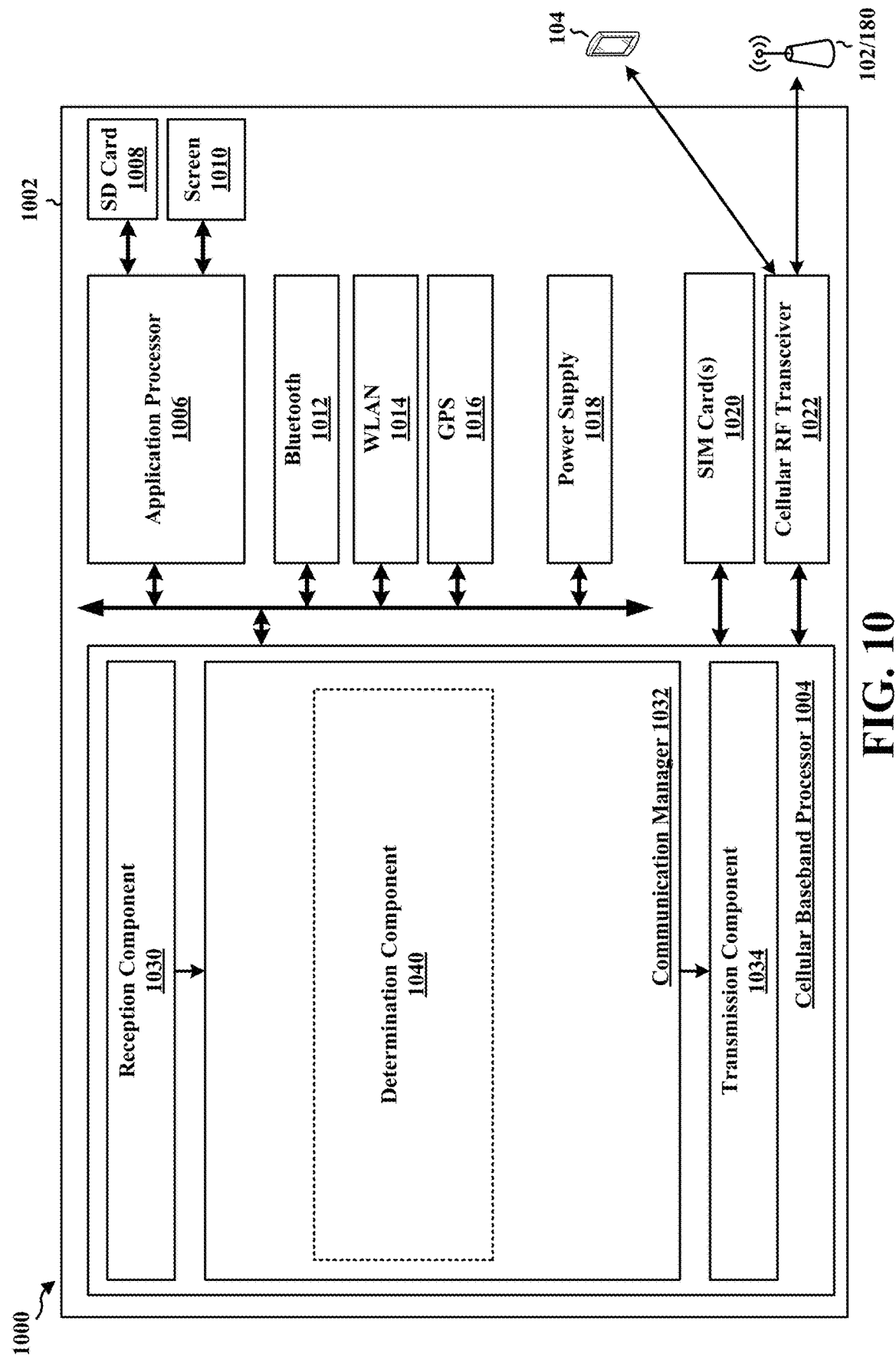
FIG. 10 is a diagram illustrating an example of a hardware implementation for an example apparatus.

FIG. 10 is a diagram 1000 illustrating an example of a hardware implementation for an apparatus 1002. The apparatus 1002 is a UE and includes a cellular baseband processor 1004 (also referred to as a modem) coupled to a cellular RF transceiver 1022 and one or more subscriber identity modules (SIM) cards 1020, an application processor 1006 coupled to a secure digital (SD) card 1008 and a screen 1010, a Bluetooth module 1012, a wireless local area network (WLAN) module 1014, a Global Positioning System (GPS) module 1016, and a power supply 1018. The cellular baseband processor 1004 communicates through the cellular RF transceiver 1022 with the UE 104 and/or BS 102/180. The cellular baseband processor 1004 may include a computer-readable medium/memory. The computer-readable medium/memory may be non-transitory. The cellular baseband processor 1004 is responsible for general processing, including the execution of software stored on the computer-readable medium/memory. The software, when executed by the cellular baseband processor 1004, causes the cellular baseband processor 1004 to perform the various functions described supra. The computer-readable medium/memory may also be used for storing data that is manipulated by the cellular baseband processor 1004 when executing software. The cellular baseband processor 1004 further includes a reception component 1030, a communication manager 1032, and a transmission component 1034. The communication manager 1032 includes the one or more illustrated components. The components within the communication manager 1032 may be stored in the computer-readable medium/memory and/or configured as hardware within the cellular baseband processor 1004. The cellular baseband processor 1004 may be a component of the UE 350 and may include the memory 360 and/or at least one of the TX processor 368, the RX processor 356, and the controller/processor 359. In one configuration, the apparatus 1002 may be a modem chip and include just the baseband processor 1004, and in another configuration, the apparatus 1002 may be the entire UE (e.g., see 350 of FIG. 3) and include the aforediscussed additional modules of the apparatus 1002.

The communication manager 1032 includes a determination component 1040 that is configured to receive synchronization signal block (SSB) grouping information associated with one or more SSB groups, each of the one or more SSB groups including one or more transmit-receive points (TRPs), e.g., as described in connection with 802 in FIG. 8. Determination component 1040 may also be configured to receive at least one of transmission configuration indication (TCI) information or quasi co-location (QCL) information, each of the TCI information and the QCL information indicating an SSB of the one or more SSB groups that is associated with a downlink transmit (Tx) beam for downlink data or an uplink receive (Rx) beam for uplink data, e.g., as described in connection with 804 in FIG. 8. Determination component 1040 may also be configured to communicate the downlink data from, or the uplink data to, TRPs in a same SSB group of the one or more SSB groups or TRPs in different SSB groups of the one or more SSB groups based on at least one of the SSB grouping information, the TCI information, or the QCL information, e.g., as described in connection with 814 in FIG. 8.

The apparatus may include additional components that perform each of the blocks of the algorithm in the aforementioned flowcharts of FIGS. 7 and 8. As such, each block in the aforementioned flowcharts of FIGS. 7 and 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1002, and in particular the cellular baseband processor 1004, includes means for receiving synchronization signal block (SSB) grouping information associated with one or more SSB groups, each of the one or more SSB groups including one or more transmit-receive points (TRPs); means for receiving at least one of transmission configuration indication (TCI) information or quasi co-location (QCL) information, each of the TCI information and the QCL information indicating an SSB of the one or more SSB groups that is associated with a downlink transmit (Tx) beam for downlink data or an uplink receive (Rx) beam for uplink data; and means for communicating the downlink data from, or the uplink data to, TRPs in a same SSB group of the one or more SSB groups or TRPs in different SSB groups of the one or more SSB groups based on at least one of the SSB grouping information, the TCI information, or the QCL information. The aforementioned means may be one or more of the aforementioned components of the apparatus 1002 configured to perform the functions recited by the aforementioned means. As described supra, the apparatus 1002 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 11:
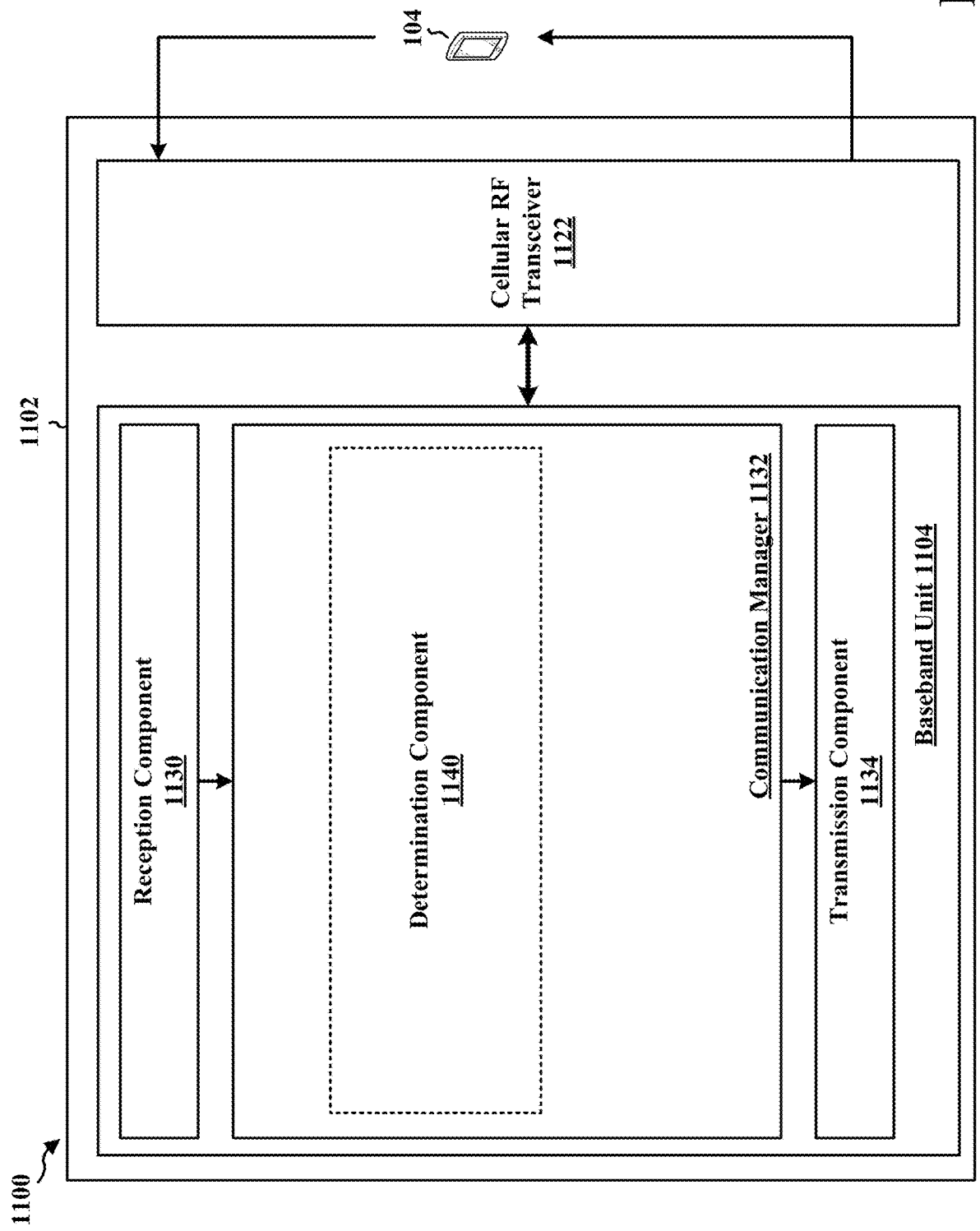
FIG. 11 is a diagram illustrating an example of a hardware implementation for an example apparatus.

FIG. 11 is a diagram 1100 illustrating an example of a hardware implementation for an apparatus 1102. The apparatus 1102 is a base station (BS) and includes a baseband unit 1104. The baseband unit 1104 may communicate through a cellular RF transceiver 1122 with the UE 104. The baseband unit 1104 may include a computer-readable medium/memory. The baseband unit 1104 is responsible for general processing, including the execution of software stored on the computer-readable medium/memory. The software, when executed by the baseband unit 1104, causes the baseband unit 1104 to perform the various functions described supra. The computer-readable medium/memory may also be used for storing data that is manipulated by the baseband unit 1104 when executing software. The baseband unit 1104 further includes a reception component 1130, a communication manager 1132, and a transmission component 1134. The communication manager 1132 includes the one or more illustrated components. The components within the communication manager 1132 may be stored in the computer-readable medium/memory and/or configured as hardware within the baseband unit 1104. The baseband unit 1104 may be a component of the BS 310 and may include the memory 376 and/or at least one of the TX processor 316, the RX processor 370, and the controller/processor 375.

The communication manager 1132 includes a determination component 1140 that is configured to transmit synchronization signal block (SSB) grouping information associated with one or more SSB groups, each of the one or more SSB groups including one or more TRPs, e.g., as described in connection with 904 in FIG. 9. Determination component 1140 may also be configured to transmit at least one of transmission configuration indication (TCI) information or quasi co-location (QCL) information, each of the TCI information and the QCL information indicating an SSB of the one or more SSB groups that is associated with a downlink transmit (Tx) beam for downlink data or an uplink receive (Rx) beam for uplink data, e.g., as described in connection with 906 in FIG. 9. Determination component 1140 may also be configured to communicate the downlink data to, or the uplink data from, at least one user equipment (UE) based on at least one of the SSB grouping information, the TCI information, or the QCL information, e.g., as described in connection with 910 in FIG. 9.

The apparatus may include additional components that perform each of the blocks of the algorithm in the aforementioned flowcharts of FIGS. 7 and 9. As such, each block in the aforementioned flowcharts of FIGS. 7 and 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1102, and in particular the baseband unit 1104, includes means for transmitting synchronization signal block (SSB) grouping information associated with one or more SSB groups, each of the one or more SSB groups including one or more TRPs; means for transmitting at least one of transmission configuration indication (TCI) information or quasi co-location (QCL) information, each of the TCI information and the QCL information indicating an SSB of the one or more SSB groups that is associated with a downlink transmit (Tx) beam for downlink data or an uplink receive (Rx) beam for uplink data; and means for communicating the downlink data to, or the uplink data from, at least one user equipment (UE) based on at least one of the SSB grouping information, the TCI information, or the QCL information. The aforementioned means may be one or more of the aforementioned components of the apparatus 1102 configured to perform the functions recited by the aforementioned means. As described supra, the apparatus 1102 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is a method of wireless communication of a user equipment (UE). The method includes receiving synchronization signal block (SSB) grouping information associated with one or more SSB groups, each of the one or more SSB groups including one or more transmit-receive points (TRPs); receiving at least one of transmission configuration indication (TCI) information or quasi co-location (QCL) information, each of the TCI information and the QCL information indicating an SSB of the one or more SSB groups that is associated with a downlink transmit (Tx) beam for downlink data or an uplink receive (Rx) beam for uplink data; and communicating the downlink data from, or the uplink data to, TRPs in a same SSB group of the one or more SSB groups or TRPs in different SSB groups of the one or more SSB groups based on at least one of the SSB grouping information, the TCI information, or the QCL information.

Aspect 2 is the method of aspect 1, further comprising identifying at least one of one or more timing advance (TA) parameters or one or more power control (PC) parameters for at least one Tx beam, where the uplink data is communicated to the TRPs in the same SSB group or the TRPs in different SSB groups based on at least one of the one or more TA parameters or the one or more PC parameters.

Aspect 3 is the method of any of aspects 1 and 2, where at least one of the one or more TA parameters or the one or more PC parameters are identified separately for each of the at least one Tx beam when the uplink data is communicated to the TRPs in different SSB groups.

Aspect 4 is the method of any of aspects 1 to 3, further comprising determining whether the downlink data is communicated from, or the uplink data is communicated to, the TRPs in the same SSB group or the TRPs in different SSB groups based on at least one of the SSB grouping information, the TCI information, or the QCL information.

Aspect 5 is the method of any of aspects 1 to 4, where communicating the downlink data from, or the uplink data to, the TRPs in the same SSB group or the TRPs in different SSB groups based on at least one of the SSB grouping information, the TCI information, or the QCL information further comprises: receiving the downlink data from, or transmitting the uplink data to, the TRPs in the same SSB group or the TRPs in different SSB groups based on at least one of the SSB grouping information, the TCI information, or the QCL information.

Aspect 6 is the method of any of aspects 1 to 5, further comprising decoding the downlink data received from the TRPs in the same SSB group of the one or more SSB groups or the TRPs in different SSB groups of the one or more SSB groups based on at least one of the SSB grouping information, the TCI information, or the QCL information.

Aspect 7 is the method of any of aspects 1 to 6, where each of the one or more SSB groups includes multiple SSBs, where each of the multiple SSBs in the one or more SSB groups is associated with an SSB attribute.

Aspect 8 is the method of any of aspects 1 to 7, where the SSB attributes associated with the multiple SSBs in one of the one or more SSB groups are equivalent to the SSB attributes associated with the multiple SSBs in each of the one or more SSB groups.

Aspect 9 is the method of any of aspects 1 to 8, where one of the SSB attributes associated with one of the multiple SSBs is a Tx beam pattern of the SSB.

Aspect 10 is the method of any of aspects 1 to 9, further comprising selecting at least one Rx beam or Tx beam for communication based on at least one SSB attribute associated with at least one of the multiple SSBs, where the at least one Rx beam or Tx beam is selected based on an SSB attribute associated with an SSB in one of the one or more SSB groups or based on an SSB attribute associated with multiple SSBs in each of the one or more SSB groups.

Aspect 11 is the method of any of aspects 1 to 10, where the TCI information is associated with one or more TCIs, each of the one or more TCIs corresponding to at least one of a QCL type or an SSB, where the TCI information indicates the SSB associated with the downlink Tx beam or the uplink Rx beam.

Aspect 12 is the method of any of aspects 1 to 11, further comprising performing a Doppler shift estimate for at least one downlink Tx-Rx beam pair, where the downlink data is communicated from the TRPs in the same SSB group or the TRPs in different SSB groups based on the Doppler shift estimate, where the Doppler shift estimate is performed separately for each of the at least one downlink Tx-Rx beam pair when the downlink data is communicated from the TRPs in different SSB groups.

Aspect 13 is the method of any of aspects 1 to 12, where the SSB grouping information is received via system information (SI) or radio resource control (RRC) signaling.

Aspect 14 is the method of any of aspects 1 to 13, where at least one of the TCI information or the QCL information is received via downlink control information (DCI).

Aspect 15 is an apparatus for wireless communication including means for implementing a method as in any of aspects 1 to 14.

Aspect 16 is an apparatus for wireless communication including at least one processor coupled to a memory and configured to implement a method as in any of aspects 1 to 14.

Aspect 17 is a computer-readable medium storing computer executable code, where the code when executed by a processor causes the processor to implement a method as in any of aspects 1 to 14.

Aspect 18 is a method of wireless communication of a base station. The method includes transmitting synchronization signal block (SSB) grouping information associated with one or more SSB groups, each of the one or more SSB groups including one or more TRPs; transmitting at least one of transmission configuration indication (TCI) information or quasi co-location (QCL) information, each of the TCI information and the QCL information indicating an SSB of the one or more SSB groups that is associated with a downlink transmit (Tx) beam for downlink data or an uplink receive (Rx) beam for uplink data; and communicating the downlink data to, or the uplink data from, at least one user equipment (UE) based on at least one of the SSB grouping information, the TCI information, or the QCL information.

Aspect 19 is the method of aspect 18, where the uplink data is communicated from the at least one UE based on one or more timing advance (TA) parameters or one or more power control (PC) parameters for at least one Tx beam.

Aspect 20 is the method of any of aspects 18 and 19, further comprising determining the SSB grouping information associated with the one or more SSB groups.

Aspect 21 is the method of any of aspects 18 to 20, where communicating the downlink data to, or the uplink data from, the at least one UE based on at least one of the SSB grouping information, the TCI information, or the QCL information further comprises: transmitting the downlink data to, or receiving the uplink data from, the at least one UE based on at least one of the SSB grouping information, the TCI information, or the QCL information.

Aspect 22 is the method of any of aspects 18 to 21, further comprising encoding the downlink data transmitted to the at least one UE based on at least one of the SSB grouping information, the TCI information, or the QCL information.

Aspect 23 is the method of any of aspects 18 to 22, where each of the one or more SSB groups includes multiple SSBs, where each of the multiple SSBs in the one or more SSB groups is associated with an SSB attribute.

Aspect 24 is the method of any of aspects 18 to 23, where the SSB attributes associated with the multiple SSBs in one of the one or more SSB groups are equivalent to the SSB attributes associated with the multiple SSBs in each of the one or more SSB groups.

Aspect 25 is the method of any of aspects 18 to 24, where one of the SSB attributes associated with one of the multiple SSBs is a Tx beam pattern of the SSB.

Aspect 26 is the method of any of aspects 18 to 25, where at least one Rx beam is used for communication based on at least one SSB attribute associated with at least one of the multiple SSBs.

Aspect 27 is the method of any of aspects 18 to 26, where the at least one Rx beam is used for communication based on an SSB attribute associated with an SSB in one of the one or more SSB groups or based on an SSB attribute associated with multiple SSBs in each of the one or more SSB groups.

Aspect 28 is the method of any of aspects 18 to 27, where the TCI information is associated with one or more TCIs, each of the one or more TCIs corresponding to at least one of a QCL type or an SSB, where the TCI information indicates the SSB associated with the downlink Tx beam or the uplink Rx beam.

Aspect 29 is the method of any of aspects 18 to 28, where the downlink data is communicated to the at least one UE based on a Doppler shift estimate for at least one downlink Tx-Rx beam pair.

Aspect 30 is the method of any of aspects 18 to 29, where the SSB grouping information is transmitted via system information (SI) or radio resource control (RRC) signaling.

Aspect 31 is the method of any of aspects 18 to 30, where at least one of the TCI information or the QCL information is transmitted via downlink control information (DCI).

Aspect 32 is an apparatus for wireless communication including means for implementing a method as in any of aspects 18 to 31.

Aspect 33 is an apparatus for wireless communication including at least one processor coupled to a memory and configured to implement a method as in any of aspects 18 to 31.

Aspect 34 is a computer-readable medium storing computer executable code, where the code when executed by a processor causes the processor to implement a method as in any of aspects 18 to 31.

What is claimed is:

1. A method of wireless communication of a user equipment (UE), comprising:
   receiving synchronization signal block (SSB) grouping information associated with one or more SSB groups, each of the one or more SSB groups including one or more transmit-receive points (TRPs), wherein each of the one or more SSB groups includes multiple SSBs, and each of the multiple SSBs is associated with a respective SSB attribute;
   receiving at least one of transmission configuration indication (TCI) information or quasi co-location (QCL) information, each of the TCI information and the QCL information indicating an SSB of the one or more SSB groups that is associated with a downlink transmit (Tx) beam for downlink data or an uplink receive (Rx) beam for uplink data;
   selecting at least one Rx beam or Tx beam for communication based on at least one SSB attribute associated with at least one of the multiple SSBs, wherein the at least one Rx beam or Tx beam is selected based on a first SSB attribute associated with a first SSB in one of the one or more SSB groups or based on a second SSB attribute associated with the multiple SSBs in each of the one or more SSB groups; and
   communicating the downlink data from, or the uplink data to, the TRPs in a same SSB group of the one or more SSB groups or the TRPs in different SSB groups of the one or more SSB groups based on at least one of the SSB grouping information, the TCI information, or the QCL information.

2. The method of claim 1, further comprising:
   identifying at least one of one or more timing advance (TA) parameters or one or more power control (PC) parameters for at least one Tx beam, wherein the uplink data is communicated to the TRPs in the same SSB group or the TRPs in the different SSB groups based on at least one of the one or more TA parameters or the one or more PC parameters.

3. The method of claim 2, wherein at least one of the one or more TA parameters or the one or more PC parameters are identified separately for each of the at least one Tx beam when the uplink data is communicated to the TRPs in the different SSB groups.

4. The method of claim 1, further comprising:
determining whether the downlink data is communicated from, or the uplink data is communicated to, the TRPs in the same SSB group or the TRPs in the different SSB groups based on at least one of the SSB grouping information, the TCI information, or the QCL information.

5. The method of claim 1, wherein communicating the downlink data from, or the uplink data to, the TRPs in the same SSB group or the TRPs in the different SSB groups based on at least one of the SSB grouping information, the TCI information, or the QCL information further comprises:
receiving the downlink data from, or transmitting the uplink data to, the TRPs in the same SSB group or the TRPs in the different SSB groups based on at least one of the SSB grouping information, the TCI information, or the QCL information.

6. The method of claim 5, further comprising:
decoding the downlink data received from the TRPs in the same SSB group of the one or more SSB groups or the TRPs in the different SSB groups of the one or more SSB groups based on at least one of the SSB grouping information, the TCI information, or the QCL information.

7. The method of claim 1, wherein SSB attributes associated with the multiple SSBs in one of the one or more SSB groups are equivalent to the SSB attributes associated with the multiple SSBs in each of the one or more SSB groups.

8. The method of claim 1, wherein the SSB attribute associated with one of the multiple SSBs is a Tx beam pattern of the SSB.

9. The method of claim 1, wherein the TCI information is associated with one or more TCIs, each of the one or more TCIs corresponding to at least one of a QCL type or one SSB of the multiple SSBs, wherein the TCI information indicates the SSB associated with the downlink Tx beam or the uplink Rx beam.

10. The method of claim 1, further comprising:
performing a Doppler shift estimate for at least one downlink Tx-Rx beam pair, wherein the downlink data is communicated from the TRPs in the same SSB group or the TRPs in the different SSB groups based on the Doppler shift estimate, wherein the Doppler shift estimate is performed separately for each of the at least one downlink Tx-Rx beam pair when the downlink data is communicated from the TRPs in the different SSB groups.

11. The method of claim 1, wherein the SSB grouping information is received via system information (SI) or radio resource control (RRC) signaling.

12. The method of claim 1, wherein at least one of the TCI information or the QCL information is received via downlink control information (DCI).

13. An apparatus for wireless communication of a user equipment (UE), comprising:
a memory; and
at least one processor coupled to the memory and configured to:
receive synchronization signal block (SSB) grouping information associated with one or more SSB groups, each of the one or more SSB groups including one or more transmit-receive points (TRPs), wherein each of the one or more SSB groups includes multiple SSBs, and each of the multiple SSBs is associated with a respective SSB attribute;
receive at least one of transmission configuration indication (TCI) information or quasi co-location (QCL) information, each of the TCI information and the QCL information indicating an SSB of the one or more SSB groups that is associated with a downlink transmit (Tx) beam for downlink data or an uplink receive (Rx) beam for uplink data;
select at least one Rx beam or Tx beam for communication based on at least one SSB attribute associated with at least one of the multiple SSBs, wherein the at least one Rx beam or Tx beam is selected based on a first SSB attribute associated with a first SSB in one of the one or more SSB groups or based on a second SSB attribute associated with the multiple SSBs in each of the one or more SSB groups; and
communicate the downlink data from, or the uplink data to, the TRPs in a same SSB group of the one or more SSB groups or the TRPs in different SSB groups of the one or more SSB groups based on at least one of the SSB grouping information, the TCI information, or the QCL information.

14. A method of wireless communication of a base station, the base station being a transmit-receive point (TRP), comprising:
transmitting synchronization signal block (SSB) grouping information associated with one or more SSB groups, each of the one or more SSB groups including one or more TRPs, wherein each of the one or more SSB groups includes multiple SSBs, and each of the multiple SSBs in the one or more SSB groups is associated with a respective SSB attribute;
transmitting at least one of transmission configuration indication (TCI) information or quasi co-location (QCL) information, each of the TCI information and the QCL information indicating an SSB of the one or more SSB groups that is associated with a downlink transmit (Tx) beam for downlink data or an uplink receive (Rx) beam for uplink data; and
communicating the downlink data to, or the uplink data from, at least one user equipment (UE) based on at least one of the SSB grouping information, the TCI information, or the QCL information, wherein at least one Rx beam is used for communication based on a first SSB attribute associated with a first SSB in one of the one or more SSB groups or based on a second SSB attribute associated with the multiple SSBs in each of the one or more SSB groups.

15. The method of claim 14, wherein the uplink data is communicated from the at least one UE based on one or more timing advance (TA) parameters or one or more power control (PC) parameters for at least one Tx beam.

16. The method of claim 14, further comprising:
determining the SSB grouping information associated with the one or more SSB groups.

17. The method of claim 14, wherein communicating the downlink data to, or the uplink data from, the at least one UE based on at least one of the SSB grouping information, the TCI information, or the QCL information further comprises:
transmitting the downlink data to, or receiving the uplink data from, the at least one UE based on at least one of the SSB grouping information, the TCI information, or the QCL information.

18. The method of claim 17, further comprising:
encoding the downlink data transmitted to the at least one UE based on at least one of the SSB grouping information, the TCI information, or the QCL information.

19. The method of claim 14, wherein SSB attributes associated with the multiple SSBs in one of the one or more SSB groups are equivalent to the SSB attributes associated with the multiple SSBs in each of the one or more SSB groups.

20. The method of claim 14, wherein the SSB attribute associated with one of the multiple SSBs is a Tx beam pattern of the SSB.

21. The method of claim 14, wherein the TCI information is associated with one or more TCIs, each of the one or more TCIs corresponding to at least one of a QCL type or one SSB of the multiple SSBs, wherein the TCI information indicates the SSB associated with the downlink Tx beam or the uplink Rx beam.

22. The method of claim 14, wherein the downlink data is communicated to the at least one UE based on a Doppler shift estimate for at least one downlink Tx-Rx beam pair.

23. The method of claim 14, wherein the SSB grouping information is transmitted via system information (SI) or radio resource control (RRC) signaling.

24. The method of claim 14, wherein at least one of the TCI information or the QCL information is transmitted via downlink control information (DCI).

25. An apparatus for wireless communication of a base station, the base station being a transmit-receive point (TRP), comprising:

a memory; and at least one processor coupled to the memory and configured to:

transmit synchronization signal block (SSB) grouping information associated with one or more SSB groups, each of the one or more SSB groups including one or more TRPS, wherein each of the one or more SSB groups includes multiple SSBs, and each of the multiple SSBs in the one or more SSB groups is associated with a respective SSB attribute;

transmit at least one of transmission configuration indication (TCI) information or quasi co-location (QCL) information, each of the TCI information and the QCL information indicating an SSB of the one or more SSB groups that is associated with a downlink transmit (Tx) beam for downlink data or an uplink receive (Rx) beam for uplink data; and communicate the downlink data to, or the uplink data from, at least one user equipment (UE) based on at least one of the SSB grouping information, the TCI information, or the QCL information, wherein at least one Rx beam is used for communication based on a first SSB attribute associated with a first SSB in one of the one or more SSB groups or based on a second SSB attribute associated with the multiple SSBs in each of the one or more SSB groups.

* * * * *